United States Patent
Polanco et al.

(10) Patent No.: US 9,702,411 B2
(45) Date of Patent: Jul. 11, 2017

(54) BEARING ASSEMBLY WITH SPLIT OUTER RING HAVING INTERFERENCE FIT TABS AND METHOD OF ASSEMBLY OF BEARING

(71) Applicant: Roller Bearing Company of America, Inc., Oxford, CT (US)

(72) Inventors: Moises Polanco, Delémont (CH); Alain Monnin, Courroux (CH)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/682,266

(22) Filed: Apr. 9, 2015

(65) Prior Publication Data
US 2015/0292563 A1 Oct. 15, 2015

Related U.S. Application Data

(60) Provisional application No. 61/977,831, filed on Apr. 10, 2014, provisional application No. 62/119,307, filed on Feb. 23, 2015.

(51) Int. Cl.
*F16C 43/02* (2006.01)
*F16C 33/04* (2006.01)
(Continued)

(52) U.S. Cl.
CPC .......... *F16C 43/02* (2013.01); *F16C 11/0614* (2013.01); *F16C 17/022* (2013.01);
(Continued)

(58) Field of Classification Search
CPC .... F16C 9/04; F16C 11/0614; F16C 11/0685; F16C 17/022; F16C 2226/74;
(Continued)

(56) References Cited

U.S. PATENT DOCUMENTS 1,356,848 A * 10/1920 Bokelund ............. F16C 23/084
384/497
1,644,611 A * 10/1927 Rieffert ................... F16C 33/60
384/501
(Continued)

FOREIGN PATENT DOCUMENTS

DE 9114738 U1 3/1992
DE WO 0229270 A1 * 4/2002 ................ F16C 9/02
(Continued)

OTHER PUBLICATIONS

Extended European Search Report for EP Patent Application No. 15163173.6-1751 / 2930380, dated Nov. 16, 2015.

*Primary Examiner* — Marcus Charles
(74) *Attorney, Agent, or Firm* — Murtha Cullina LLP

(57) ABSTRACT

A bearing includes a split outer race having a first outer race member and a second outer race member that form an annular ring. The bearing includes an activation member that is rotatable from a first position to a second position and is at least partially disposed in the annular ring. A locking feature is defined by the first outer race member, the second outer race member and the activation member. The locking feature has an unlocked position and a locked position. The unlocked position corresponds to the first position of the activation member and the locked position corresponds to the second position of the activation member.

57 Claims, 23 Drawing Sheets

(51) Int. Cl.
  *F16C 33/46* (2006.01)
  *F16C 41/04* (2006.01)
  *F16C 17/22* (2006.01)
  *F16C 11/06* (2006.01)
  *F16C 17/02* (2006.01)
  *F16C 23/04* (2006.01)

(52) U.S. Cl.
  CPC ............ *F16C 23/046* (2013.01); *F16C 41/04* (2013.01); *F16C 11/0609* (2013.01); *F16C 11/0685* (2013.01); *F16C 33/046* (2013.01); *F16C 2226/76* (2013.01); *Y10T 29/49648* (2015.01); *Y10T 29/49682* (2015.01)

(58) Field of Classification Search
  CPC .. F16C 2226/76; F16C 23/045; F16C 33/046; F16C 41/04; F16C 43/02; F16F 11/0609; F10D 2125/28; B23D 31/003; Y10T 29/49696; Y10T 29/49682; Y10T 29/49648
  USPC ....... 384/192, 206, 208–210, 261, 273, 276, 384/296, 447, 491, 499, 503, 510; 29/898.042
  See application file for complete search history.

(56) References Cited

U.S. PATENT DOCUMENTS

| | | | | |
|---|---|---|---|---|
| 1,649,258 A | * | 11/1927 | Rummins | F16C 9/03 384/427 |
| 2,825,241 A | * | 3/1958 | Ferris | F01B 3/0085 188/78 |
| 2,855,252 A | | 10/1958 | Budinger et al. | |
| 3,007,754 A | * | 11/1961 | Cross | F16C 9/04 384/261 |
| 3,627,389 A | * | 12/1971 | Foote, Jr. | F16C 23/045 384/208 |
| 4,311,348 A | | 1/1982 | Olschewski et al. | |
| 4,373,759 A | | 2/1983 | Greener et al. | |
| 4,550,479 A | * | 11/1985 | Walter | F16C 29/0602 29/418 |
| 4,580,793 A | | 4/1986 | Bronson | |
| 4,708,498 A | | 11/1987 | Labedan et al. | |
| 4,865,473 A | | 9/1989 | De Vito | |
| 4,907,626 A | | 3/1990 | Mori | |
| 4,909,638 A | | 3/1990 | Muto | |
| 5,186,546 A | | 2/1993 | Abe | |
| 5,293,688 A | | 3/1994 | Koch et al. | |
| 5,524,987 A | | 6/1996 | Vigeh | |
| 5,836,700 A | | 11/1998 | Wilkie, Jr. et al. | |
| D412,336 S | * | 7/1999 | Bakoledis | D15/143 |
| 6,177,644 B1 | | 1/2001 | Wilkie, Jr. et al. | |
| 6,386,763 B1 | | 5/2002 | Mack et al. | |
| 6,755,405 B2 | * | 6/2004 | Kammel | F16F 1/3873 267/141.1 |
| 7,311,447 B2 | | 12/2007 | Takeo et al. | |
| 7,458,726 B2 | | 12/2008 | Seilheimer | |
| 7,507,028 B2 | | 3/2009 | Markle | |
| 7,896,557 B2 | * | 3/2011 | Nakano | F01L 1/047 29/898.062 |
| 2006/0291763 A1 | | 12/2006 | Markle | |
| 2012/0008893 A1 | | 1/2012 | Oishi et al. | |
| 2012/0160207 A1 | * | 6/2012 | Shaffer | F02F 7/0053 123/195 R |
| 2013/0243358 A1 | | 9/2013 | Stork et al. | |

FOREIGN PATENT DOCUMENTS

| | | | |
|---|---|---|---|
| EP | 0694702 A1 | | 1/1996 |
| EP | 1600648 A3 | | 12/2011 |
| JP | 2005114029 A | * | 4/2005 |
| JP | 2006170421 A | | 6/2006 |
| WO | 0206690 A1 | | 1/2002 |
| WO | 2011026485 A1 | | 3/2011 |

* cited by examiner

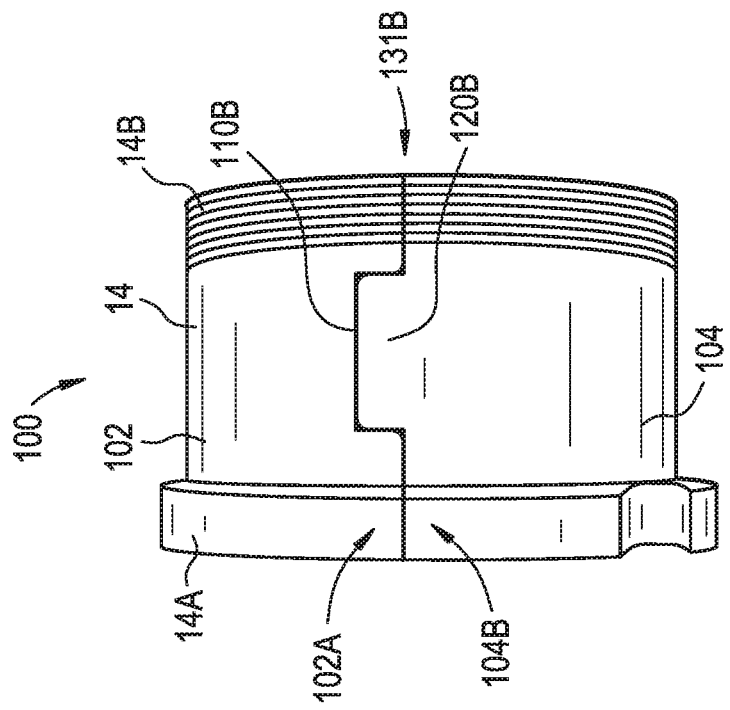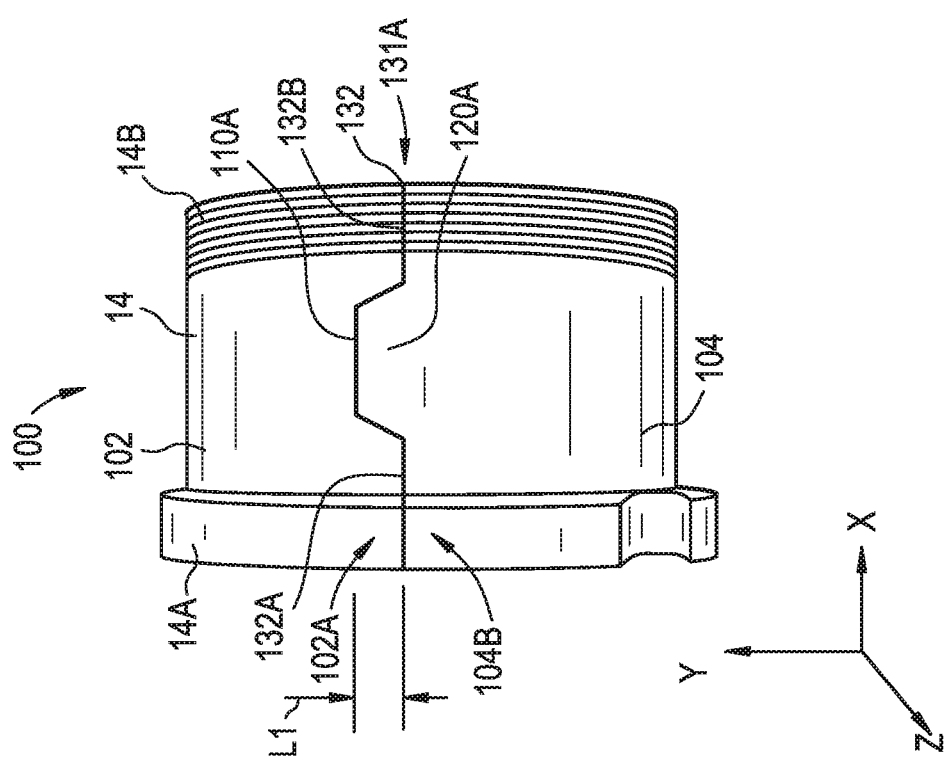

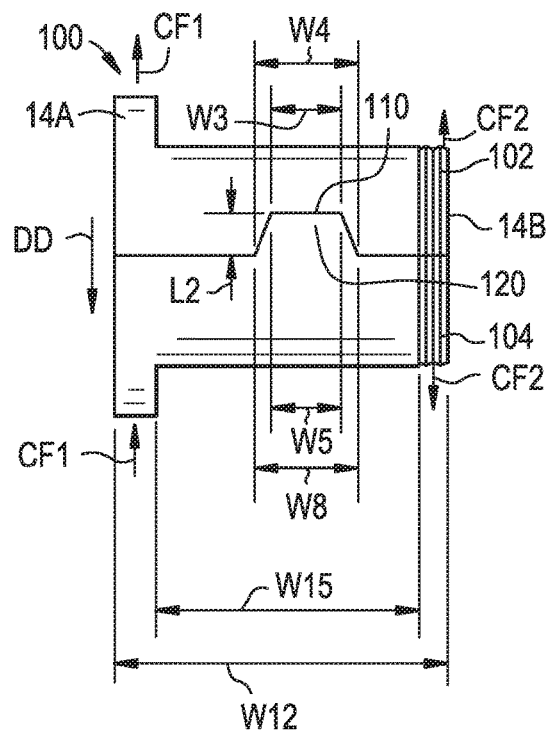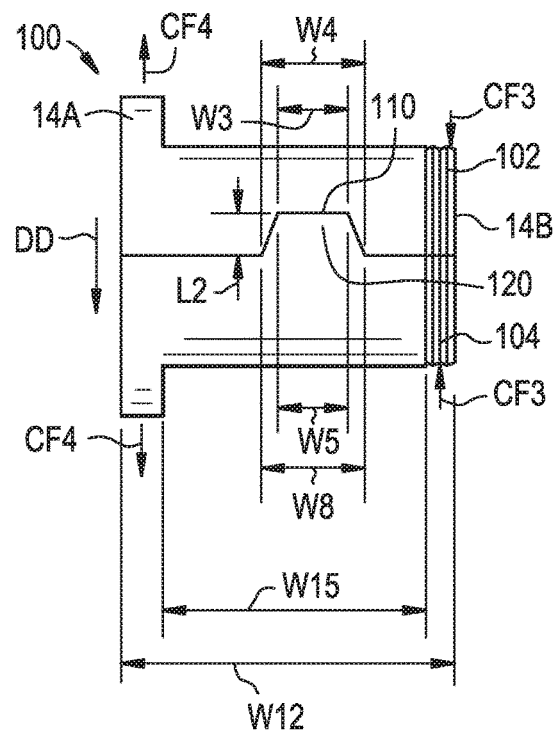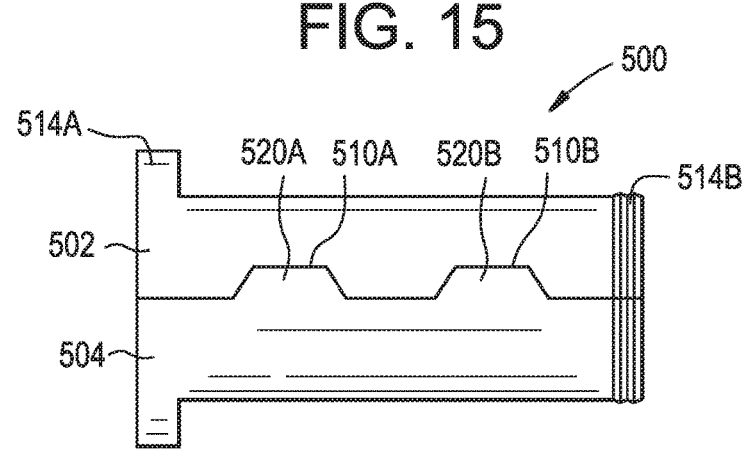

BEARING ASSEMBLY WITH SPLIT OUTER RING HAVING INTERFERENCE FIT TABS AND METHOD OF ASSEMBLY OF BEARING

CROSS-REFERENCE TO RELATED APPLICATIONS

This application claims the benefit of U.S. Provisional Patent Application Ser. No. 61/977,831 filed on Apr. 10, 2014, and U.S. Provisional Patent Application Ser. No. 62/119,307 filed on Feb. 23, 2015, both of which are incorporated herein by reference in their entirety.

FIELD OF THE INVENTION

This invention relates to a bearing assembly having a split race and, more particularly, to a split race that defines tab configuration which provides for positioning and securing the split race for bearing assembly and installation.

DESCRIPTION OF THE RELATED ART

Bearings, particularly spherical plain bearings, can be used to reduce friction between moving parts of a mechanical assembly. Spherical bearing assemblies traditionally have been comprised of an inner member positioned for rotational movement and swiveling within an outer member. The inner member typically comprises a ball having a spherical outer diameter that defines an outer engagement surface and, typically, a bore passes through the ball. The outer member typically comprises an outer ring or race having a spherical inner diameter that defines an inner engagement surface contoured to receive and retain the inner member therein. A lubricant gel, paste, or liquid such as grease, or a low-friction liner, is typically provided between the inner member and the outer member to reduce friction therebetween.

The outer member can include a flanged end and a threaded end. The bearing assembly can be secured in a bore of a housing portion of the mechanical assembly. For example, the outer member can be positioned in the bore of the housing with the threaded end of the outer member extending out of the bore of the housing portion. A locking nut can be screwed onto the threaded end of the outer member to secure the bearing assembly within the housing portion of the mechanical assembly. A washer can be disposed on the threaded end and the locking nut can be tightened to compress the washer between the locking nut and the housing portion. The use of the washer can further secure the bearing assembly within the housing portion of the mechanical assembly so that the bearing assembly remains in the same position during operation of the mechanical assembly.

Mounting the inner member into the outer member of the spherical bearing assembly has proved difficult since any method must result in the torque of the bearing being either substantially zero or within an often very narrow, predetermined, range. One conventional method comprises swaging the outer member around the inner member to fixedly retain it therein. However, ensuring the required torque of the resultant bearing assembly has proved difficult. Swaging the outer member can be difficult due to the geometry of the outer member, for example, an outer member having a large annular flange. Swaging can also be difficult or impossible due to the nature and structure as well as physical properties of the material from which the outer member is fabricated to avoid crack initiation within the structure or fracture of the structure.

One spherical bearing assembly arrangement that simplifies the mounting of the inner member into the outer member includes the use of a split race as the outer member. The split race commonly defines two or more split outer member portions which, when mounted together around the inner member, collectively define a composite outer race which serves as the outer member of the spherical bearing assembly. Each split race portion comprises a separation face that frictionally engages a corresponding separation face of another split race portion when the split races portions are assembled to form the outer member. A spherical bearing assembly having a split race as the outer member does not require swaging the outer member around the inner member to fixedly retain the inner member therein. However, such a spherical bearing assembly having a split race typically will not remain assembled such that a retaining ring is typically used to maintain the bearing assembly in an assembled configuration.

SUMMARY OF THE INVENTION

In one aspect, the present invention resides in a bearing including a split outer race having a first outer race member and a second outer race member that form an annular ring; an activation member rotatable from a first position to a second position, the activation member at least partially disposed in the annular ring; and a locking feature defined by the first outer race member, the second outer race member and the activation member, the locking feature having an unlocked position and a locked position, the unlocked position corresponding to the first position of the activation member and the locked position corresponding to the second position of the activation member.

In another aspect, the present invention resides in a method of assembling a bearing having a split outer race, the method including providing a split outer race having first outer race member and second outer race member that form an annular ring; providing an activation member; providing a locking feature defined by the first outer race member, the second outer race member and the activation member, the locking feature having an unlocked position and a locked position; positioning the activation member in the first outer race member; forming the annular ring by engaging the second outer race member with the first outer race member such that the activation member is at least partially disposed in the annular ring; and rotating the activation member from a first position to a second position to move the locking feature from the unlocked position to the locked position.

BRIEF DESCRIPTION OF THE DRAWINGS

FIG. 2 is a side view of one embodiment of the simple installation split race of the spherical bearing assembly of FIG. 1.

FIG. 3 is a side view of another embodiment of the simple installation split race of the spherical bearing assembly of FIG. 1.

FIGS. 14A-14B are a schematic side views of the bearing of FIGS. 1-11 illustrating the tab and indentation width configuration.

FIG. 15 is a schematic side view of a split race having two tabs and two indentations.

DETAILED DESCRIPTION OF THE INVENTION

Figure 1:
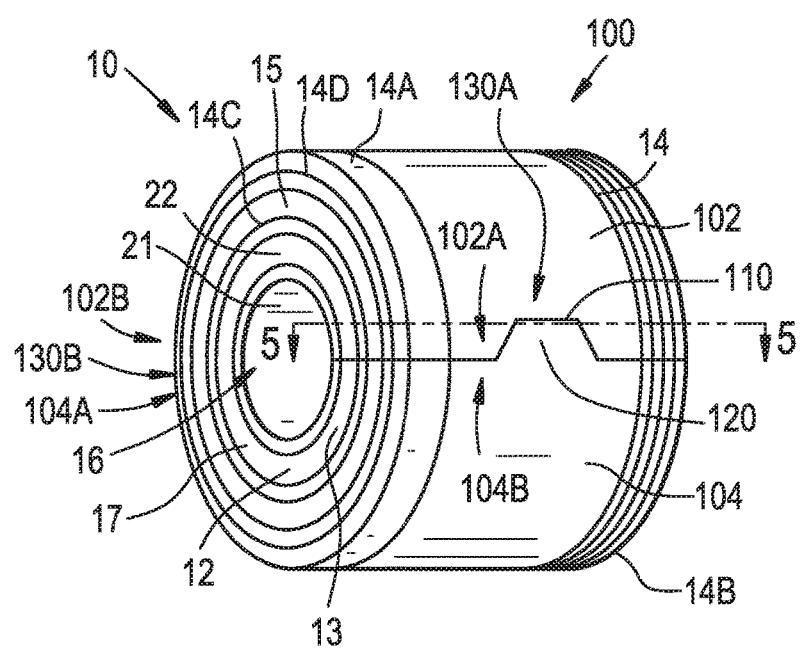
FIG. 1 is an isometric view of one embodiment of a simple installation split race forming an outer member of a spherical bearing assembly in accordance with the present invention.

As shown in FIG. 1, a simple installation split race in accordance with the present invention is designated generally by the reference number 100 and is hereinafter referred to "split race 100"; and a spherical bearing assembly having the split race 100 is designated generally by the reference number 10 and is hereinafter referred to "bearing assembly 10." The split race 100 forms an annular ring or outer member 14 of the bearing assembly 10. The split race 100 includes a first outer race member 102 and a second outer race member 104 that, when assembled, cooperate to form the outer member 14. The first outer race member 102 defines a first end 102A and a second end 102B; and the second outer race member 104 defines a first end 104A and a second end 104B. The first end 102A of the first outer race member 102 engages the second end 104B of the second outer race member 104 forming a split race profile 130A of the split race 100 (e.g., a mating surface profile); and the second end 102B of the first outer race member 102 engages the first end 104A of the second outer race member 104 forming a split race profile 130B of the split race 100 (e.g., a mating surface profile).

The first end 102A of the first outer race member 102 includes a circumferentially extending indentation 110 and the second end 104B of the second outer race member 104 includes a corresponding circumferentially extending tab projection 120. Similarly, the first end 104A of the second outer race member 104 includes a circumferentially extending indentation 110 and the second end 102B of the first outer race member 102 includes a corresponding circumferentially extending tab projection 120. Upon assembly, the indentation 110 of one of the first and second outer race members 102 and 104 engages the tab projection 120 of the other of the first outer race member 102 and the second outer race member 104 such that respective the indentation 110 and the respective tab projection 120 snap together and hold the first outer race member 102 to the second outer race member 104. While the split race 100 is shown and described as including the first outer race member 102 and second outer race member 104, each respectively defining a circumferentially extending indentation 110 and tab projection 120 such that the assembled first outer race member 102 and the second outer race member 104 form the outer member 14, the present invention is not limited in this regard as the split race 100 can comprise more than two sections, each section respectively defining a circumferentially extending indentation 110 and tab projection 120 such that the assembled totality of the sections form the outer member 14, without departing from the broader aspects of the invention.

While the split race 100 is shown and described as having one tab projection 120 and one indentation 110 on each of the first outer race member 102 and the second outer race member 104, the present invention is not limited in this regard as a split outer race 500 may include a first outer race member 502 and a second outer race member 504, each having two tabs 520A and 520B and two indentations 510A and 510B positioned axially adjacent to one another as shown in FIG. 15, or may employ more than two tabs projections and more than two indentations.

As further shown in FIG. 1, an inner member 12 is partially or fully disposed in the outer member 14 and the inner member 12 is misalignable and rotatable in relation to the outer member 14. In one embodiment, the inner member 12 comprises a ball 13. The inner member 12 defines an outer surface 22 and a bore 16 extending therethrough that forms a substantially cylindrical inner surface 21 for receiving and engaging an outer surface of a shaft (not shown) by press fitting, pinning, staking, or the like. While the bore 16 is shown and described as extending through the inner member 12, the present invention is not limited in this regard as the bore 16 can extend part-way through the inner member 12, or the bore may define a stepped-bore, without departing from the broader aspects of the invention. In one embodiment, a chamfer 17 extends axially and radially outward from the inner surface 21 to the outer surface 22. In one embodiment, the outer member 14 includes an annular flange 14A extending radially outwardly from an axial first end and a thread 14B defined in an axial second end configured to engage and be secured within a housing (not shown) such that a locking nut (not shown) can be screwed onto the thread 14B of the outer member 14 to secure the bearing assembly 10 within the housing.

One embodiment of the split race 100 of the bearing assembly 10 is shown in FIG. 2. The first end 102A of the first outer race member 102 engages the second end 104B of the second section 104 forming a rectilinear split race profile 131A. The split race profile 131A includes a rectilinear indentation 110A extending circumferentially from the first end 102A of the first outer race member 102, and a corresponding rectilinear tab projection 120A extending circumferentially from the second end 104B of the second section 104. Another embodiment of the split race 100 of the bearing assembly 10 is shown in FIG. 3. The first end 102A of the first outer race member 102 engages the second end 104B of the second outer race member 104 forming a curvilinear split race profile 131B. The split race profile 131B includes a curvilinear indentation 110B extending circumferentially from the first end 102A of the first outer race member 102, and a corresponding curvilinear tab projection 120B extending circumferentially from the second end 104B of the second outer race member 104. As further shown in FIG. 2, the first outer race member 102 defines the first separation face 132 including the first planar section 132A, the indentation 110A, and a second planar section 132B.

Figure 4A:
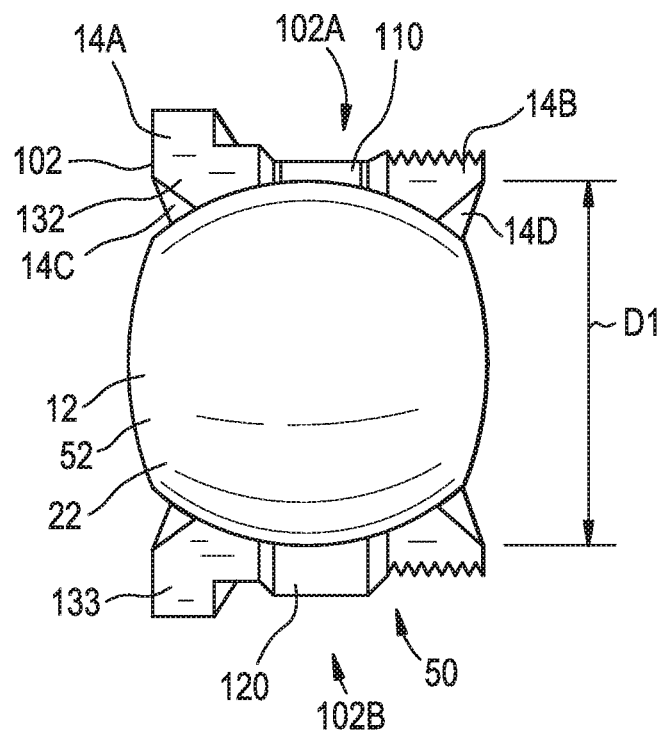
FIGS. 4A and 4B are side views of a portion of the spherical bearing assembly of FIG. 1 wherein the split race is unassembled.
Figure 4B:
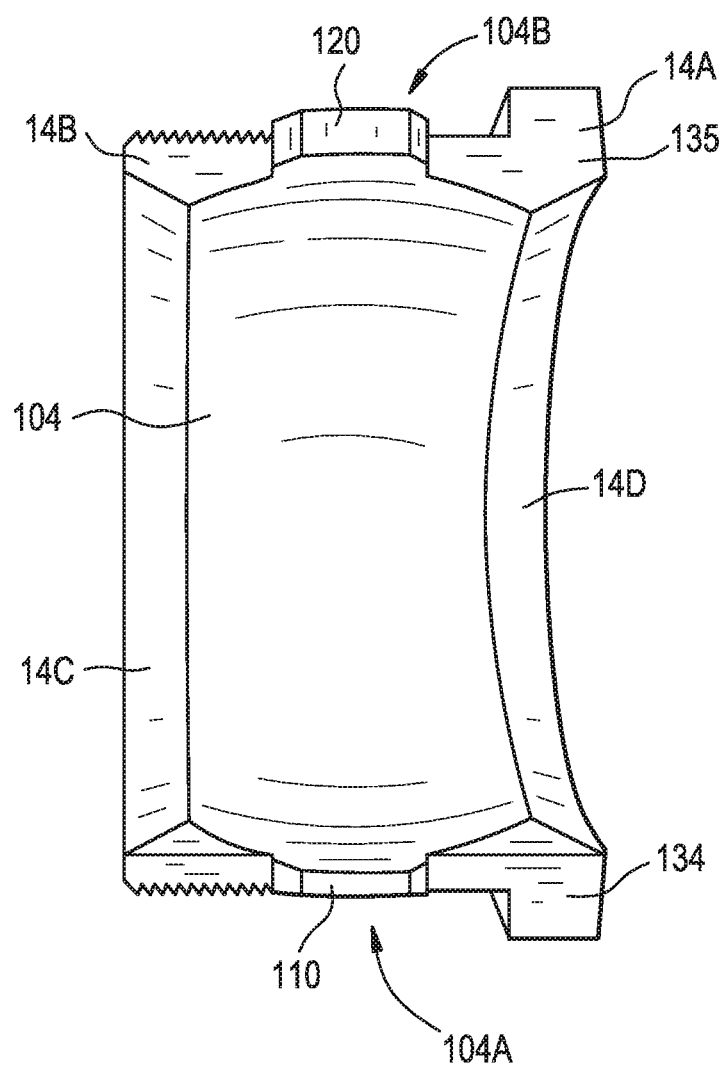

As shown in FIG. 4A, the first end 102A of the first outer race member 102 includes the indentation 110 and the second end 102B includes the tab projection 120. The first end 102A of the first outer race member 102 defines a first axially extending edge or a first separation face 132 having the indentation 110 circumferentially extending therein. The second end 102B of the first outer race member 102 defines a second axially extending edge or a second separation face 133 having the tab projection 120 projecting circumferentially therefrom. As shown in FIG. 4B, the first end 104A of the second outer race member 104 includes the indentation 110 and the second end 104B includes the tab projection 120. The first end 104A of the second outer race member 104 defines a third axially extending edge or a third separation face 134 having the indentation 110 circumferentially extending therein. The second end 104B of the second outer race member 104 defines a fourth axially extending edge or a fourth separation face 135 having the tab projection 120 projecting circumferentially therefrom. When assembled, the tab projection 120 projecting circumferentially from the second separation face 133 of the first outer race member 102 is positioned in the indentation 110 circumferentially extending into the third separation face 134 of the second outer race member 104. Similarly, the tab projection 120 projecting circumferentially from the fourth separation face 135 of the second outer race member 104 is positioned in the indentation 110 circumferentially extending into the first separation face 132 of the first outer race member 102. The positioning of the respective tab projections 120 in the corresponding indentations 110 form a selective locking feature 50 for selectively locking the first outer race member 102 to the second outer race member 104 in a locked position. The locking feature 50 has an unlocked position wherein the first outer race member 102 to the second outer race member 104 are not assembled into the annular ring. In the locked position, the first separation face 132 of the first outer race member 102 frictionally engages the fourth separation face 135 of the second outer race member 104 to form the split race profile 130A (FIG. 1), and the second separation face 133 of the first outer race member 102 frictionally engages the third separation face 134 of the second outer race member 104 to form the split race profile 130B (FIG. 1). In one embodiment and as shown in FIGS. 4A and 4B, the first and second outer race members 102 and 104 each define a first chamfer 14C and a second chamfer 14D such that when assembled, the outer member 14 correspondingly defines the first chamfer 14C and the second chamfer 14D.

Figure 5:
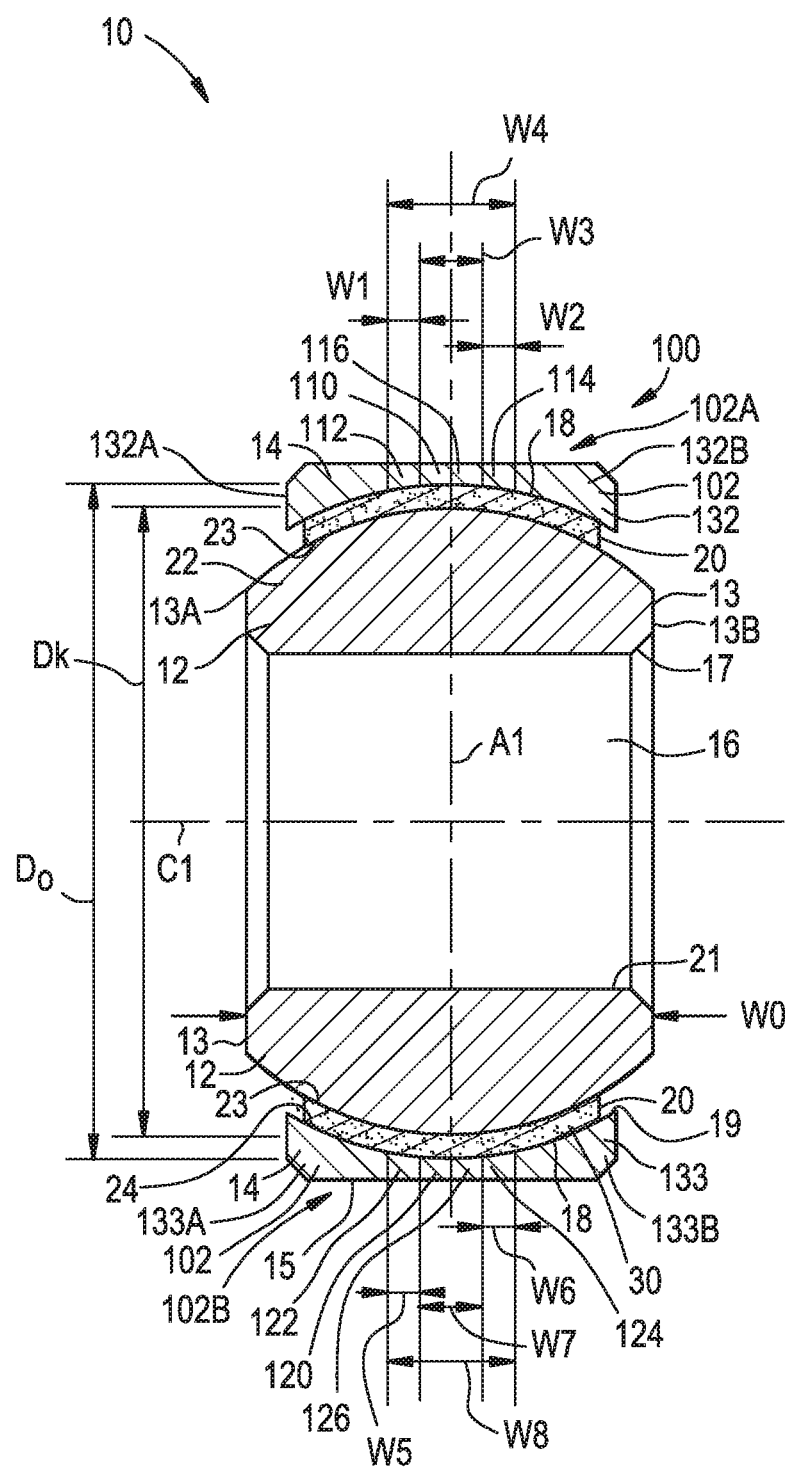
FIG. 5 is a cross section view of the spherical bearing assembly of FIG. 1 taken along line 5-5 of FIG. 1.

A bearing assembly 10 is shown in FIG. 5 and includes the split race 100 as the outer member 14. The flange 14A and the thread 14B of the outer member 14 are not shown in FIG. 5. The outer member 14 includes an outer surface 15 and an inner surface 19 (e.g., a concave spherical surface), at least a portion of which defines an inner engagement surface 18 having an inner diameter $D_o$. The inner member 12 defines a width W0, an outer diameter $D_k$, and an axial face 13 on each axial end. The inner member 12 further defines the outer surface 22 (e.g., convex spherical surface), at least a portion of which defines an outer engagement surface 23, and the bore 16. The inner engagement surface 18 of the outer member 14 is configured or contoured to slidingly engage or receive correspondingly configured or contoured outer engagement surface 22 of the inner member 12. When the inner member 12 is disposed in the outer member 14, an area of engagement 20 is defined by an interface of the inner engagement surface 18 of the outer member 14 and outer engagement surface 22 of the inner member 12. In one embodiment, a lubricant 24, such as for example grease, is disposed within the area of engagement 20. The term "lubricant" as used herein includes installing in the area of engagement 20, or on one or both of the inner engagement surface 18 and outer engagement surface 22, a coating exhibiting low-friction and high-wear properties, a low-friction liner, a lubricious fabric liner, and the like. In one embodiment, the bearing assembly 10 includes a self-lubricating liner 30 disposed in the area of engagement 20. In one embodiment, the lubricant 24 comprises a high-temperature solid film lubricant, often referred to as a dry film, which is rated for high-temperature environments, for example in excess of 500° F.

As further shown in FIG. 5, the split race 100 including the outer member 14 defines a radially central axis C1 and an axially central axis A1. The radially central axis A1 also defines an axis of rotation of the outer member 14. The first end 102A of the first outer race member 102 defines the first separation face 132. The second end 102B of the first outer race member 102 defines the second separation face 133. The first separation face 132 includes a first planar section 132A, the indentation 110, and a second planar section 132B. The second separation face 133 includes a third planar section 133A, the tab projection 120, and a fourth planar section 133B. The indentation 110 includes a first inclined section 112 having a first width W1, a second inclined section 114 having a second width W2, and a first circumferentially extended planar section 116 extending between the first and second inclined sections 112 and 114 and having a third width W3; the indentation 110 having a total width or fourth width W4. The tab projection 120 includes a third inclined section 122 having a fifth width W5, a fourth inclined section 124 having a sixth width W6, and a second circumferentially extended planar section 126 extending between the third and fourth inclined sections 122 and 124 and having a seventh width W7; the tab projection 120 having a total width or eighth width W8. In one embodiment, width W1 corresponds to width W5, width W2 corresponds to width W6, and width W3 corresponds to width W7.

Figure 6:
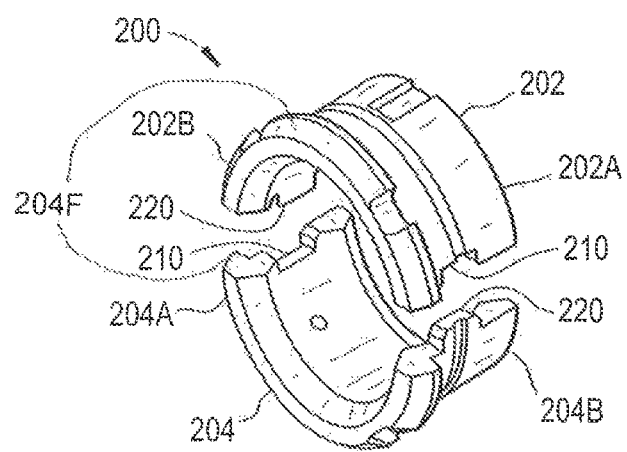
FIG. 6 is an isometric view of another embodiment of a split race forming an outer member of a spherical bearing assembly in accordance with the present invention.

A split race 200 is depicted in FIG. 6 and is similar to the split race 100 shown in the preceding figures, thus like elements are given a like element number preceded by the numeral 2. The split race 200 includes a first outer race member 202 and a second outer race member 204. The first outer race member 202 defines a first end 202A and a second end 202B; and the second outer race member 204 defines a first end 204A and a second end 204B. The first end 202A of the first outer race member 202 engages the second end 204B of the second outer race member 204; and the second end 202B of the first outer race member 202 engages the first end 204A of the second outer race member 204. The first end 202A of the first outer race member 202 includes a circumferentially extending indentation 210 and the second end 204B of the second outer race member 204 includes a corresponding circumferentially extending tab projection 220. Similarly, the first end 204A of the second outer race member 204 includes a circumferentially extending indentation 210 and the second end 202B of the first outer race member 202 includes a corresponding circumferentially extending tab projection 220. The split race 200 has a radially outward extending flange 204F extending circumferentially therearound. Upon assembly, the indentation 210 of one of the first outer race member 202 and the second outer race member 204 engages the tab projection 220 of the other of the first outer race member 202 and the second outer race member 204 such that respective the indentation 210 and the respective tab projection 220 snap together and hold the first outer race member 202 to the second outer race member.

Figure 7A:
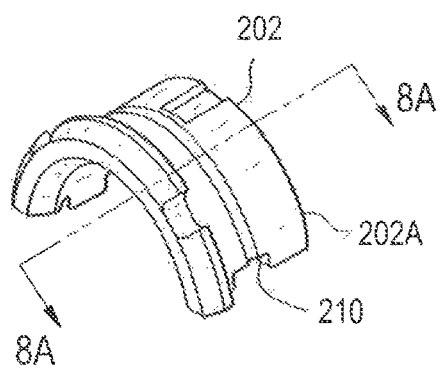
FIG. 7A is an isometric view of one section of the split race of FIG. 6.
Figure 7B:
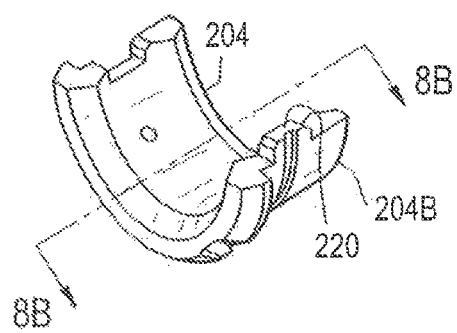
FIG. 7B is an isometric view of another section of the split race of FIG. 6.
Figure 8A:
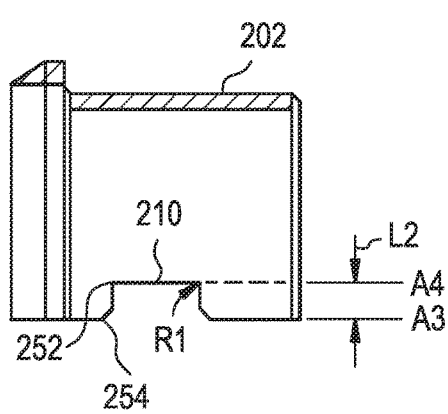
FIG. 8A is a cross section view of the section of the split race of FIG. 7A taken along line 8A-8A of FIG. 7A.
Figure 8B:
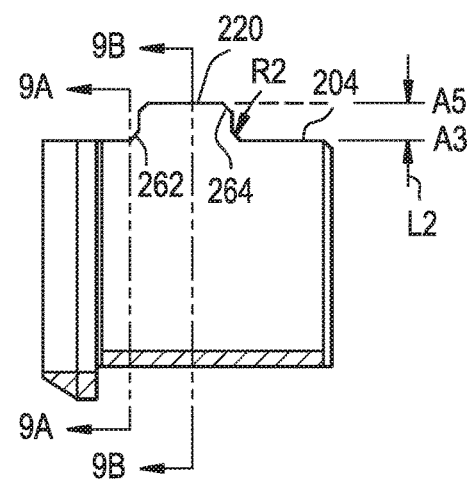
FIG. 8B is a cross section view of the section of the split race of FIG. 7B taken along line 8B-8B of FIG. 7B.

The first outer race member 202 of split race 200 is shown in FIGS. 7A and 8A; and the second outer race member 204 of split race 200 is shown in FIGS. 7B and 8B. For optimum assembly of the split race 200 around an inner member of a spherical bearing, for example inner member 12 of bearing assembly 10 (FIG. 5), tolerances of the geometric features of the indentation 210 and the tab projection 220 are controlled. In one embodiment and as shown in FIG. 8A, each circumferentially inward corner 252 defines a first radius R1. Similarly and as shown in FIG. 8B, each circumferentially inward corner 262 defines a second radius R2. In one embodiment, the first radius R1 is equivalent to the second radius R2. The first and second radii R1 and R2 reduce or eliminate stress concentrations respectively at corners 252 and 262. In one embodiment and as shown in FIG. 8A, the circumferentially inward corners 252 define a chamfer 254. Similarly and as shown in FIG. 8B, in one embodiment, the circumferentially inward corners 264 define a chamfer 264. As further shown in FIG. 8A, the indentation 210 extends circumferentially inward a length L2 from a central axis A3 of the split race 200 to a transition axis A4. As further shown in FIG. 8B, the tab projection 220 extends circumferentially outward the length L2 from the central axis A3 of the split race 200 to a transition axis A5.

Figure 9A:
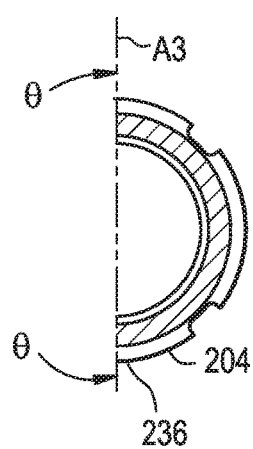
FIG. 9A is a cross section view of the section of the split race of FIG. 8B taken along line 9A-9A of FIG. 8B.
Figure 9B:
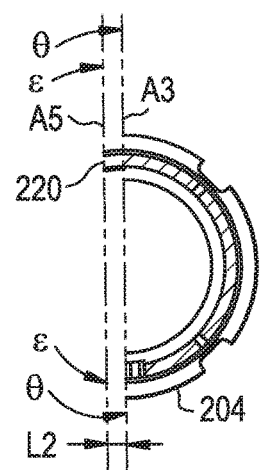
FIG. 9B is a cross section view of the section of the split race of FIG. 8B taken along line 9B-9B of FIG. 8B.
Figure 9C:
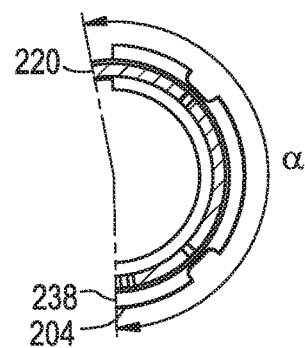
FIG. 9C is another depiction of the cross section view shown in FIG. 9B.

As shown in FIG. 9A, the second outer race member 204 defines a third axial profile 236 extending an angle θ of 180° in relation to the central axis A3 of the split race 200. As shown in FIGS. 9B and 9C, the second outer race member 204 defines an extended axial profile or a fourth axial profile 238 along the tab projection 220 extending an angle α beyond 180° the circumferential length L2 from the central axis A3 to the transition axis A5. While a cross-section of the second outer race member 204 taken at the location of the indentation 210 and the tab projection 220 exhibits an angle ϵ of 180°, the angle ϵ of 180° is rotationally displaced, or clocked, the circumferential length L2 from the central axis A3.

In one embodiment, angle α is in the range of about 180° to about 195° such that the angle ϵ is rotationally displaced or clocked about 15° from the angle θ. In one embodiment, angle α is in the range of about 190° such that the angle ϵ is rotationally displaced or clocked about 10° from the angle θ. The particular geometry or configuration of the respective indentations 210 and the respective tab projections 220 hold the first outer race member 202 to the second outer race member 204 around the inner member 12 of the spherical bearing 10. Because the tab projections 220 extend beyond 180° of the inner member 12 of the spherical bearing 10 in the assembled state, the first inner race member 202 and the second outer race member 204 of the split race 200 and the inner member 12 are locked together.

Such a relationship results in the inner ring faces 13 being configured in a perpendicular relationship to a separation face of an outer member section, for example the third or fourth separation face 134, 135 of first end 104A of the second outer race member 104 (FIG. 4B). As a result, the first outer race member 102, 202 and the second outer race member 104, 204 are assembled together around the inner member 12 of the spherical bearing 10 while the perpendicular relationship of the inner ring axial faces to the outer member separation faces is maintained. The inner member 12 is then rotated to lock the bearing assembly 10 together as a one-piece unit. In one embodiment, the tab projections 120, 220 are configured to exhibit slight interference with the inner member 12 to further secure the first outer race member 102, 202 to the second outer race member 104, 204 around the inner member 12. In one embodiment, such interference is in the range of up to about 5 mm (0.2 inch). In another embodiment, such interference is about 0.3 mm (0.012 inch).

Figure 10:
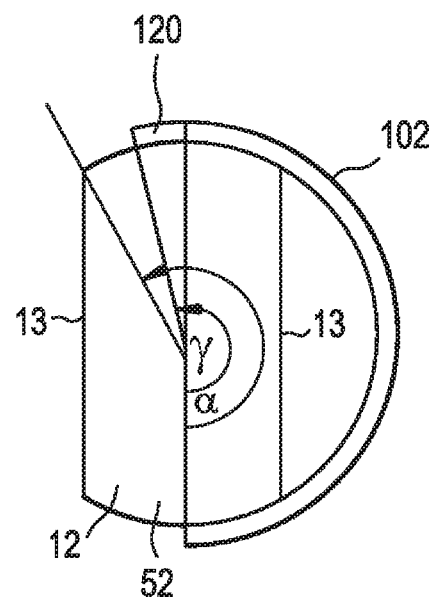
FIG. 10 is a side view of one section of the split race of FIG. 5 having the inner member disposed therein.
Figure 11:
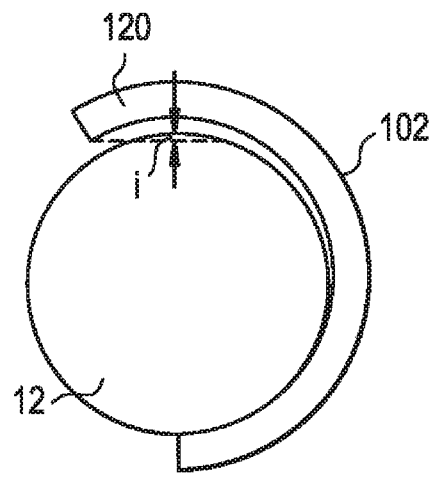
FIG. 11 is an isometric view of one embodiment of a simple installation split race forming an outer member of a spherical bearing assembly in accordance with the present invention.

In one embodiment, the maximum circumferential angle α is determined in relation to the width W0 if the inner member 12 (FIG. 5). The relationship is expressed as:

$$\text{tabs angle} = 180° + \cos^{-1}\frac{W}{D_K} - 2°$$

where "tabs angle" is the circumferential angle α; "W" is the width W0 of the inner member 12; and "$D_k$" is the outer diameter of the inner member 12. As shown in FIGS. 10 and 11, the first outer race member 102 of the split race 100 is assembled around the inner member 12. The tabs angle or the circumferential angle α represents the maximum circumferential tab angle of the tab projection 120. A circumferential angle γ represents the actual circumferential tab angle of the tab projection 120. An interference "i" is the measure of interference between the first outer race member 102 and the inner member 12. The interference is determined by the following relationship:

$$i = D_k - \{D_o/2[1 - \cos \gamma]\}$$

where "i" is the interference; "$D_k$" is the outer diameter of the inner member 12; "$D_o$" is the inner diameter of the outer member 14 (or a section thereof); and "γ" is the actual circumferential tab angle of the tab projection 120. A clearance between the first outer race member 102 and the inner member 12 is represented as negative interference "−i". Examples of calculated interference are as follows:

Example 1: $D_k$=1 inch (25.4 mm); $D_o$=1 inch (25.4 mm); γ=180°; i=0.

Example 2: $D_k$=0.990 inch (25.15 mm); $D_o$=1 inch (25.4 mm); γ=180°; i=−0.01 (clearance).

Example 3: $D_k$=1 inch (25.4 mm); $D_o$=1 inch (25.4 mm); γ=270°; i=0.5 inch (12.7).

Example 4: $D_k$=0.999 inch (25.37 mm); $D_o$=1 inch (25.4 mm); γ=193.1°; i=0.012 (0.3 mm).

In one embodiment, the circumferential tab angle γ of the tab projection 120 is in the range of between 180° to about 195°. In one embodiment, the circumferential tab angle γ of the tab projection 120 is in the range of between 180° to about 190°. In one embodiment, the circumferential tab angle γ of the tab projection 120 is about 193°.

Referring to FIGS. 4 and 10, the inner member 12 defines an activation member 52 of the locking feature 50. As described above, the activation member 52 is rotatable from a first position corresponding to the unlocked position of the locking feature 50 to a second position for activating the locking feature 50 into the locked position thereby selectively locking the first outer race member 102 to the second outer race member 104. In the locked position, the activation member 52 cooperates with the locking feature 50 to create the interference fit i between the first outer race member 102 and the second outer race member 104. In one embodiment, the interference fit i is defined by the tab projection 120 of the first outer race member 102 being positioned in the indentation 110 of the second outer race member 104, and the tab projection 120 of the second outer race member 104 being positioned in the indentation 110 of the first outer race member 102. In one embodiment, rotating the activation member 52 about 90 degrees transforms the locking feature 50 from the unlocked position to into the locked position.

Once the inner member 12 is snapped into the first outer race member 202 and the second outer race member 204 of the split race 200, the bearing assembly 10 will not come apart without significant forces being applied. This enables the bearing assembly 10 to be shipped as a one-piece unit without the danger of the several pieces coming apart before being assembled into a bearing housing or other upper level assembly. The bearing assembly 10 snaps together and cannot be taken apart without the application of forces more significant than those experienced in typical shipping environments.

The first outer race member 102, 202 and second outer race member 104, 204 of the split race 100, 200 hold the inner member 12 and the outer member 14 together as a single unit, namely the bearing assembly 10. In addition, the first outer race member 102, 202 and the second outer race member 104, 204 prevent the inner member 12 and the outer member 14 from separating and also prevent the intermixing of unmatched bearing components. The indentation 110, 210 and the corresponding tab projection 120, 220 simplify the manufacturing and assembly of the bearing assembly 10 by positioning and securing the first outer race member 102, 202 and the second outer race member 104, 204 forming the outer member 14 and preventing axial misalignment during the manufacturing and assembly operations. In addition, the tab projections 120, 220 increase the axial stiffness of the outer member 14.

In one embodiment, the bearing assembly 10 includes one or more annular seals for inhibiting the ingress of contaminants into the bearing assembly 10, particularly the area of engagement 20, and prevents such contaminants from impinging the inner engagement surface 18 of the outer member 14 and outer engagement surface 22 of the inner member 12.

The inner member 12 can be fabricated from a steel or a steel alloy, including but not limited to, AISI 52100, AISI 440C, 4340 or 4130 alloy steel, 17-4PH, 15-5PH, 13PH-8MO. The inner member 12 can be fabricated from other materials that are sufficiently hard or can be sufficiently hardened through heat treatment and that exhibit sufficiently low friction properties, such as for example copper alloys. The inner ring also can be fabricated from titanium. The inner member 12 can be plated or coated, and a self-lubricating treatment can be applied to the contoured surface of the inner member 12.

The outer member 14 can be fabricated from a steel or a steel alloy, including but not limited to, 4340, 4130, 17-4PH. 15-5PH, 13PH-8MO, or another suitable material. In one embodiment, the outer member 14 is fabricated from titanium to facilitate swaging of the outer member 14 without initiating any cracks. The outer member 14 including the split outer member 100, 200 eliminates geometrical constrains in applications where swaging is difficult or impossible, such as for example swaging an outer member having a large annular flange. The outer member 14 including the split outer member 100, 200 provides for the application of a particular coating, for example a hard coating, thereon because such coatings cannot be swaged without damaging the coating. Moreover, the split outer member 100, 200 is easier to coat, for example by spray-coating, than a non-split outer member. In some embodiments the material may have a lower hardness that allows the outer member 14 to be formed in a press operation around the inner member 12, while still having adequate strength to handle forces during operation of the bearing assembly 10. The outer member 14 can be fabricated from a material that provides a sufficient mating surface to a self-lubricating coating composition. The inner member 12 and the outer member 14 can be fabricated from the same or different materials.

A method is provided in accordance with the present invention for assembling a bearing having a split outer race. The method comprises providing a split outer race having a first outer race member and a second outer race member that form an annular ring; and providing an activation member. A locking feature is provided and is defined by the first outer race member, the second outer race member and the activation member. The locking feature has unlocked position and a locked position. The activation member is positioned in the first outer race member. The annular ring is then formed by engaging the second outer race member with the first outer race member such that the activation member is at least partially disposed in the annular ring. Rotating the activation member from a first position to a second position to move the locking feature from the unlocked position to the locked position.

In another embodiment, the method for assembling a bearing having a split outer race includes providing an inner member defining an axial face at each axial end and positioning first outer race member for receiving the inner member. The first outer race member includes a first edge and a second edge, the first edge having a first indentation circumferentially extending therein and the second edge having a first tab projecting circumferentially therefrom. The method further comprises aligning the axial faces of the inner member in a substantially orthogonal relation to the first and second edges of the first outer race member and positioning the inner member in the first outer race member while maintaining the orthogonal relationship. A second outer race member is cooperatively positioned around the inner member to form an annular ring with the first outer race member. The second outer race member includes a third edge and a fourth edge, the third edge having a second indentation circumferentially extending therein and the fourth edge having a second tab projecting circumferentially therefrom. The first tab is aligned with and engages the second indentation, and the second tab is aligned with and engages the first indentation. The inner member is then rotated such that the axial faces of the inner member are in a substantially parallel relation to the first and second edges of the first outer race member and the third and fourth edges of the second outer race member, and thereby locking the inner member in the annular ring formed by the first outer race member and the second outer race member.

Figure 12A:
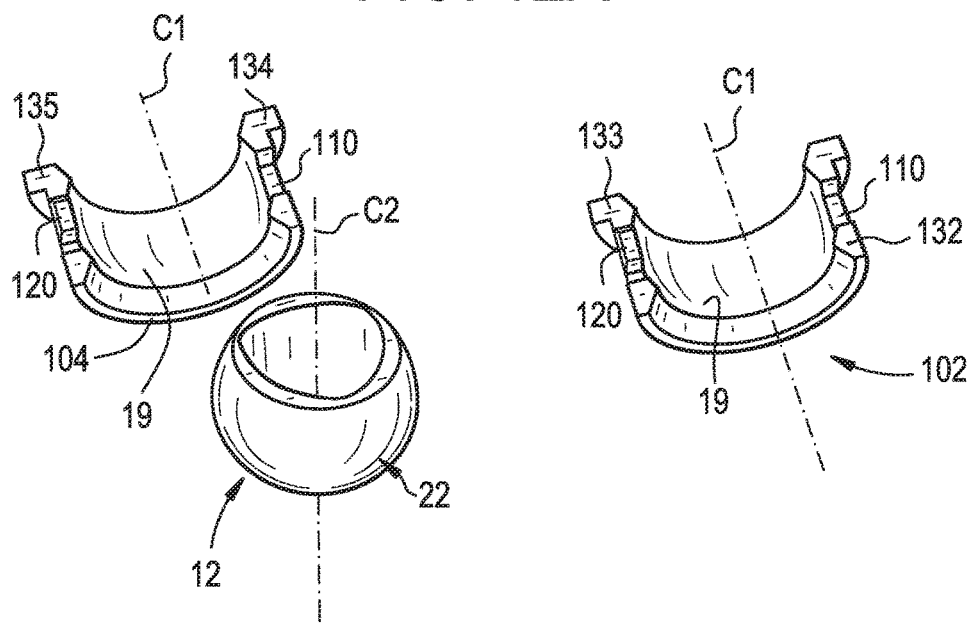
FIGS. 12A-12L are photographs of the steps for a snap fit method of assembly of the bearing of FIGS. 1-11.
Figure 12B:
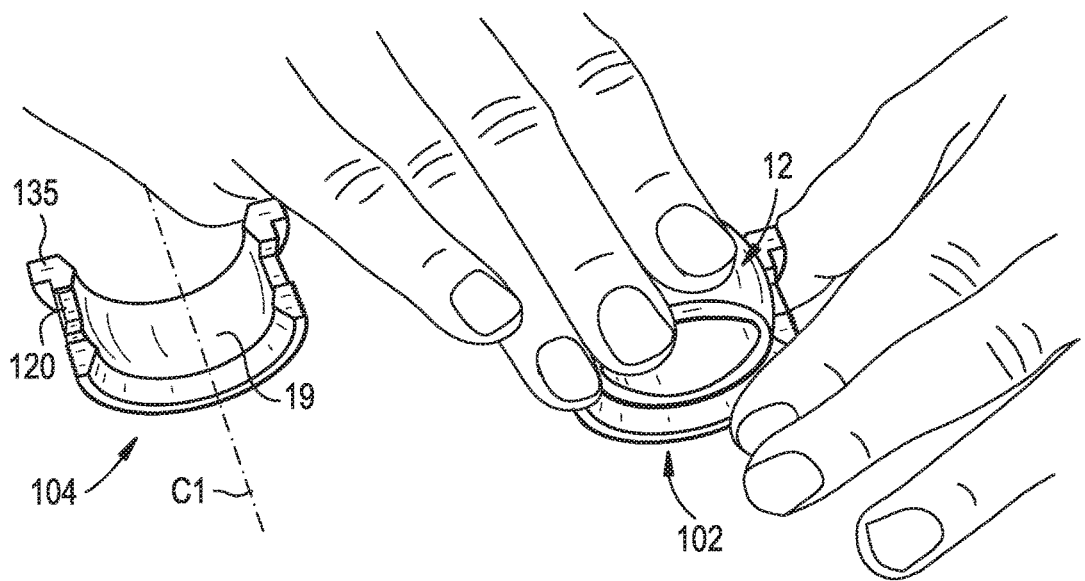
Figure 12C:
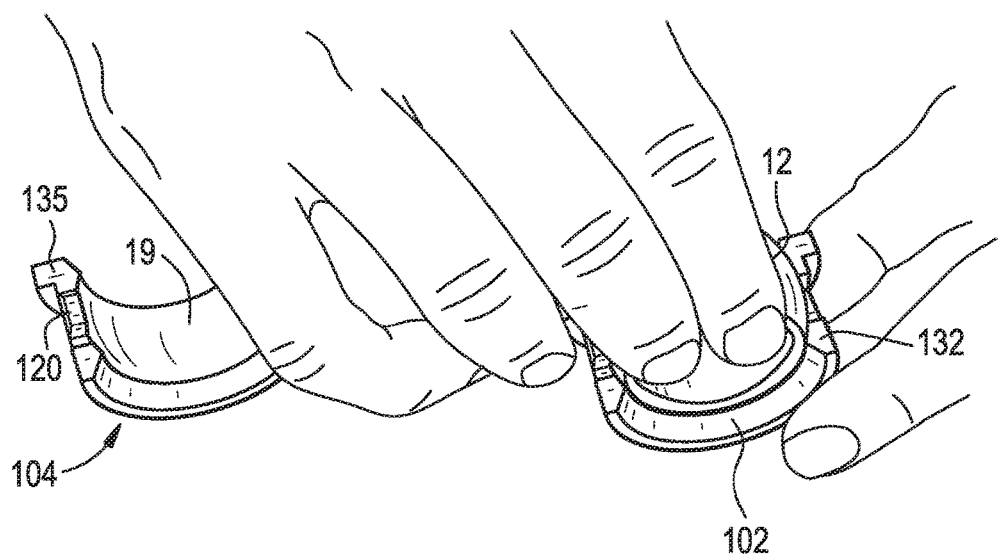
Figure 12D:
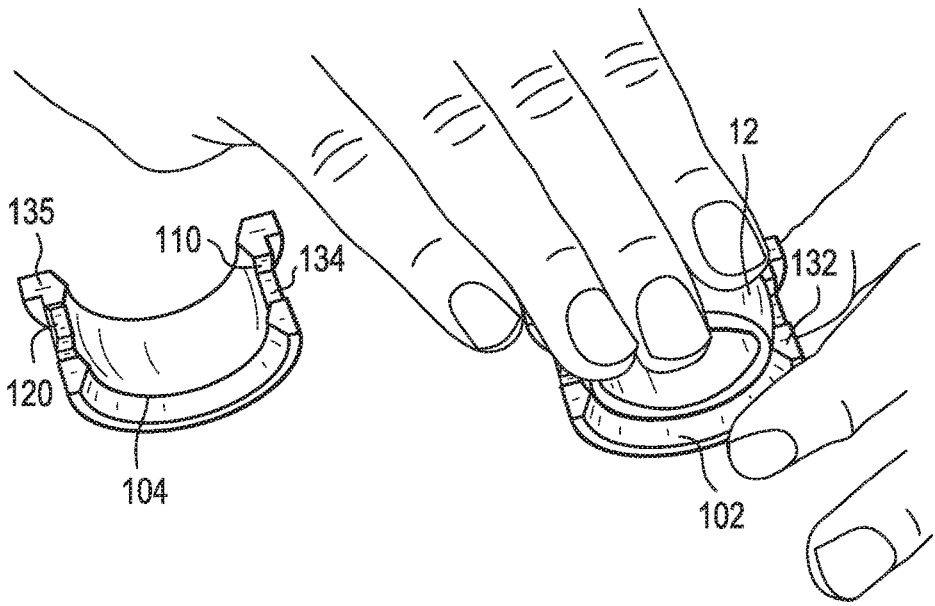
Figure 12E:
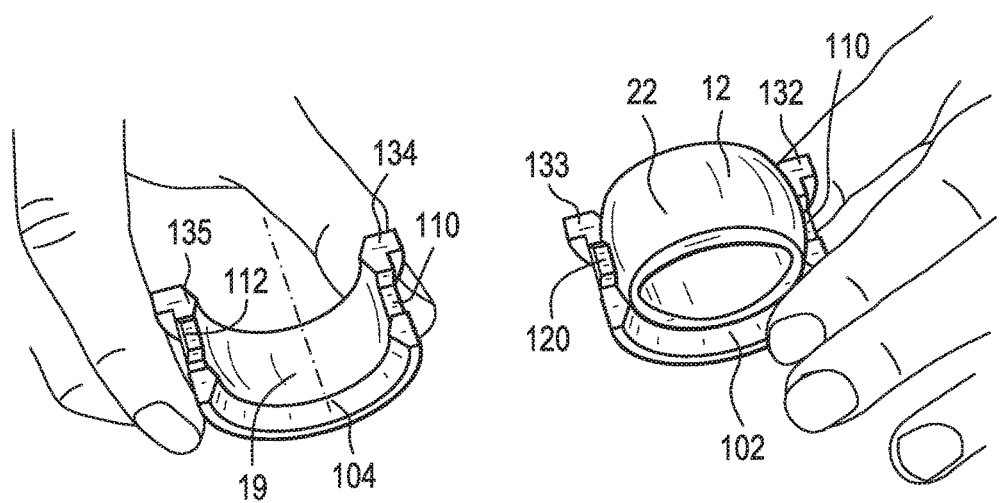
Figure 12F:
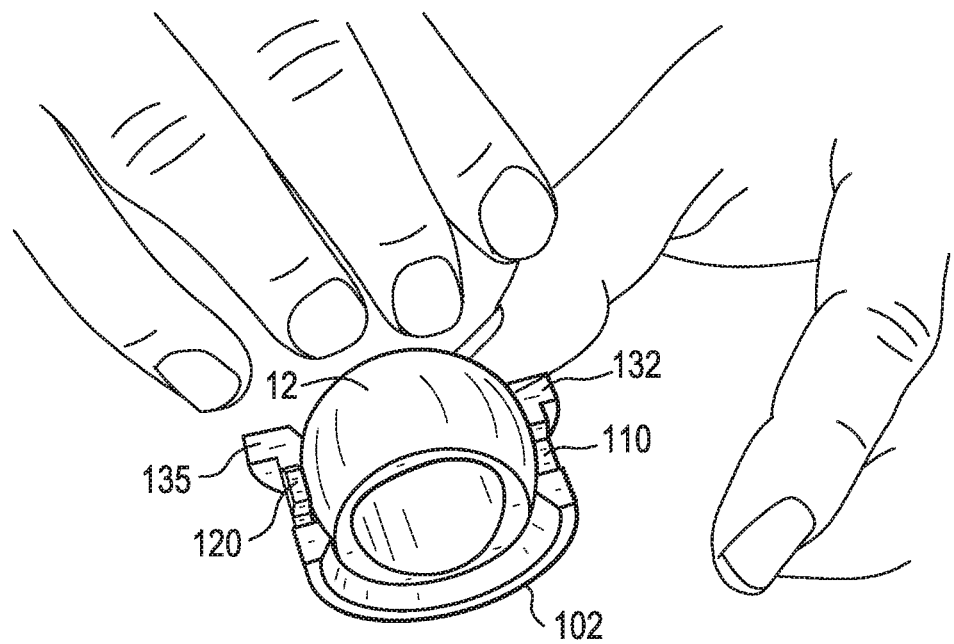
Figure 12G:
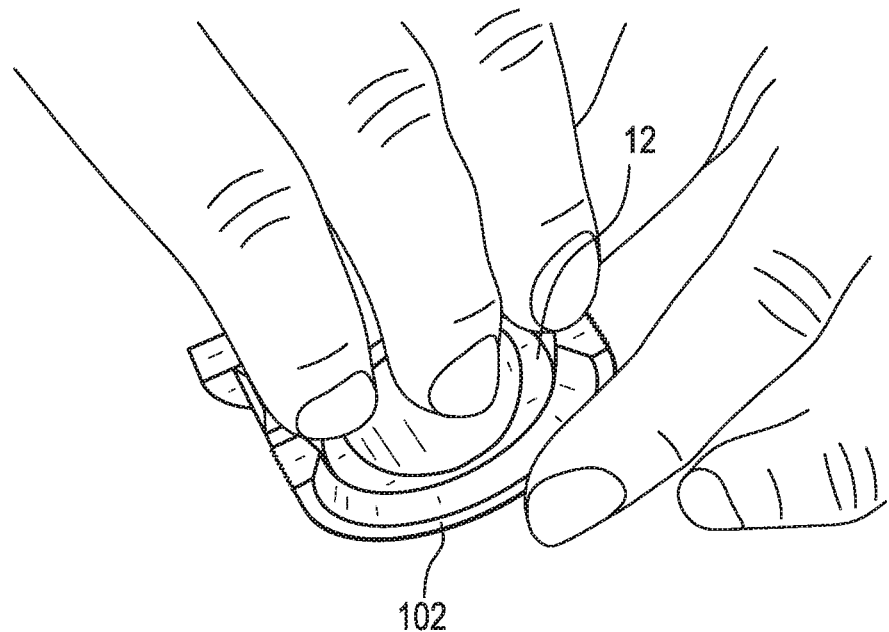
Figure 12H:
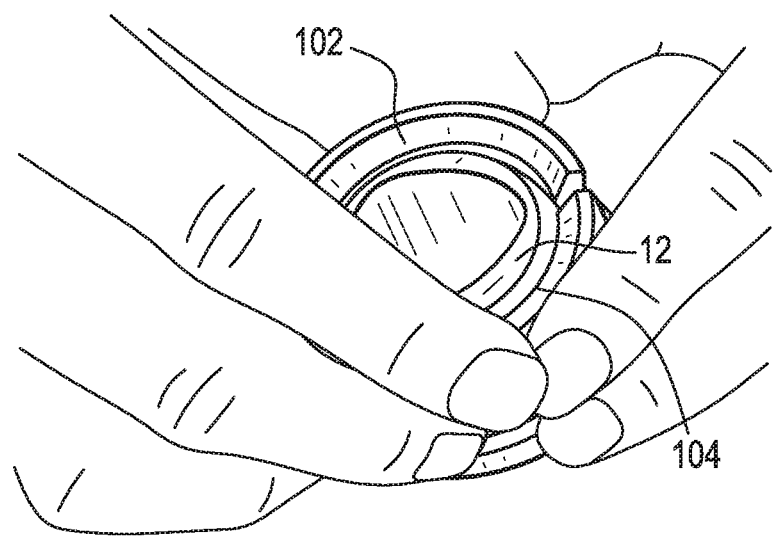
Figure 12I:
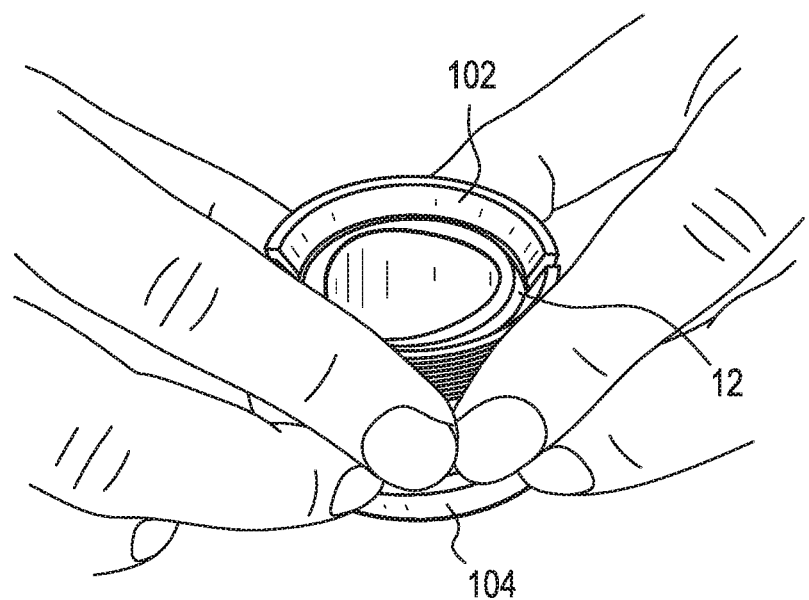
Figure 12J:
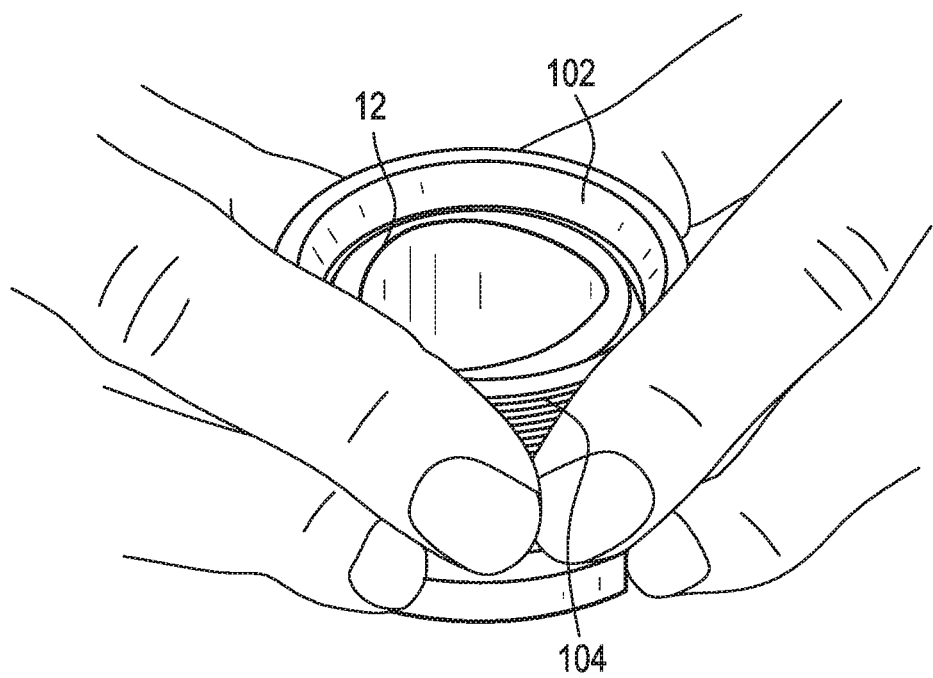
Figure 12K:
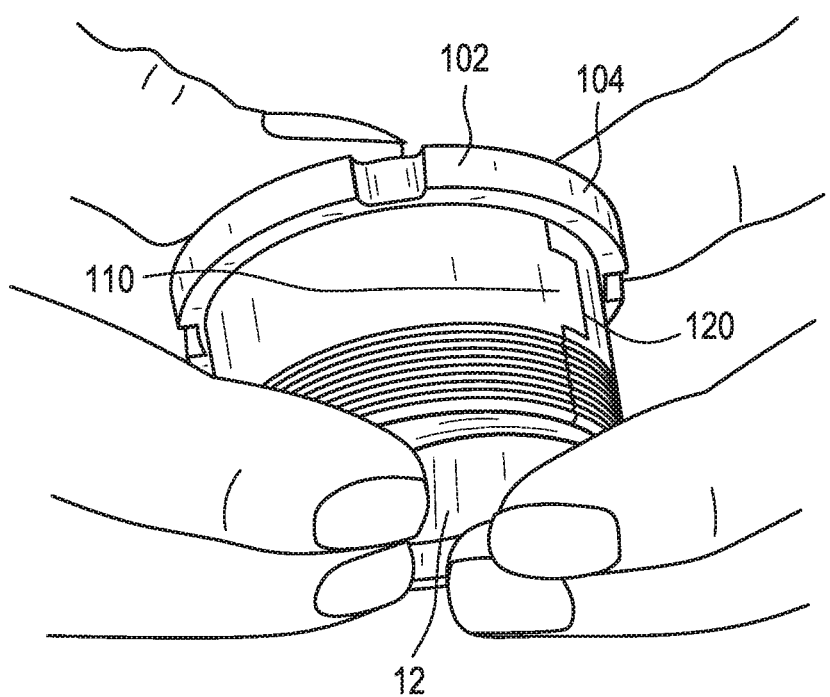
Figure 12L:
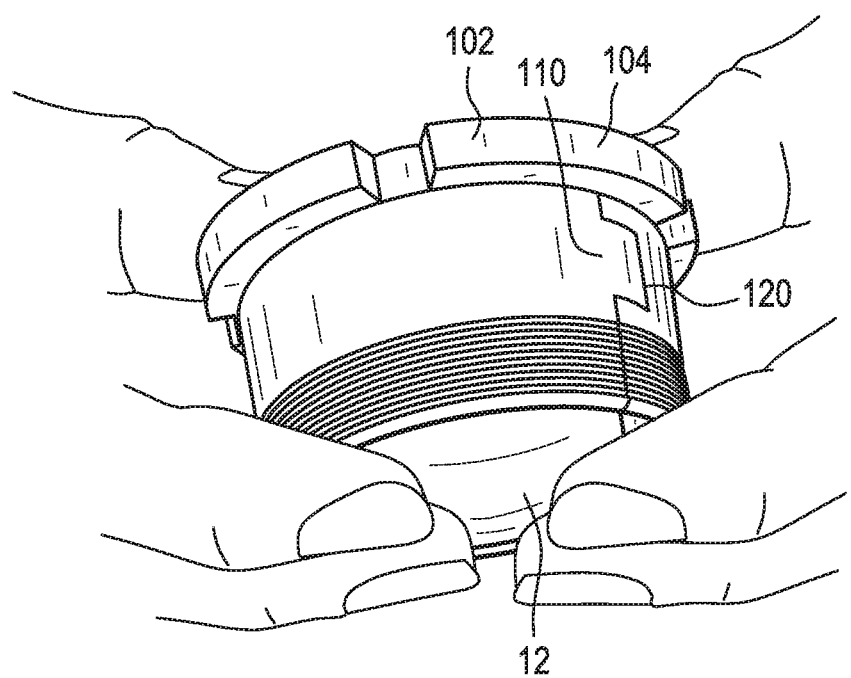

FIGS. 12A-12K illustrate the steps of a method of assembling the bearing 10 having the split outer race 100. This method is referred to herein as the snap fit method. As shown in FIG. 12A, the method includes providing a split outer race 100 having a first outer race member 102 and a second outer race member 102 that cooperate to form an annular ring or outer race 14. The annular ring 14 defines a first bore extending therethrough, the first bore being concentric about a first axis C1. A first separation face 133 and a second separation face 133 is defined on the first outer race member 102 and a third separation face 134 and a fourth separation face 135 is defined on the second outer race member 104. A concave spherical interior surface 19 is provided on each of the first outer race member 102 and the second outer race member 104. An activation member 12 (e.g., a ball 13) has a convex spherical exterior surface 22 extending between a first axial end 13A and a second axial end 13B of the activation member 12. The activation member 12 defines a second bore extending therethrough. The second bore is concentric about a second axis C2. A locking feature is defined by the first outer race member 102, the second outer race member 104 and the activation member 12. As shown in FIGS. 12B-F), the method includes snap fitting the activation member 12 in the first outer race member 102 in a first position so that the spherical exterior surface 22 engages portions of the concave spherical interior surface 19 and so that the first axis C1 is concentric with the second axis C2. As shown in FIGS. 12F-L the second outer race member 104 is snap fit over the activation member 12 to couple the second outer race member 104 to the first out race member 102 (i.e., by engaging the tabs 120 in the respective indentations 110) so that the first separation face 132 of the first outer race member 102 engages a fourth separation face 135 of the second outer race member 104 and the second separation face 133 of the first outer race member 102 engages a third separation face 134 of the second outer race member 104.

Figure 13A:
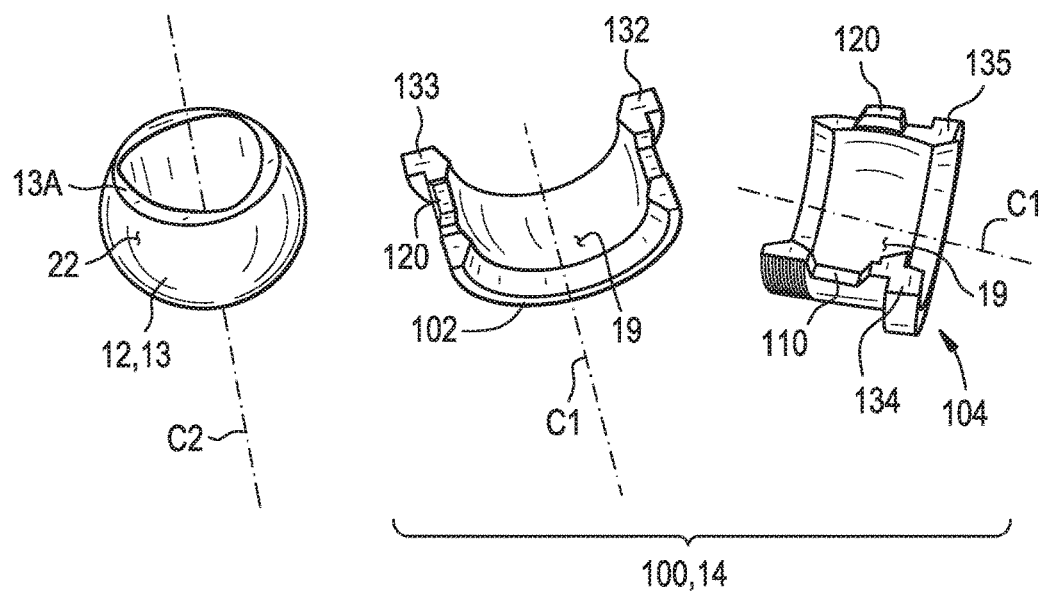
FIGS. 13A-13I are photographs of the steps for an activation member rotation method of assembling the bearing of FIGS. 1-11.
Figure 13B:
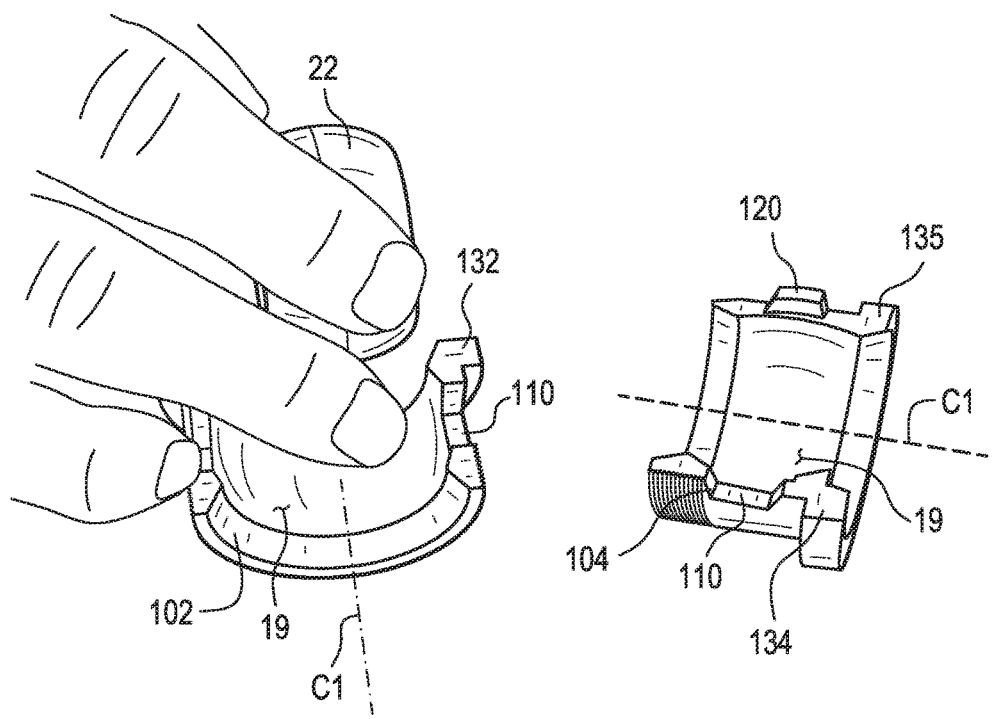
Figure 13C:
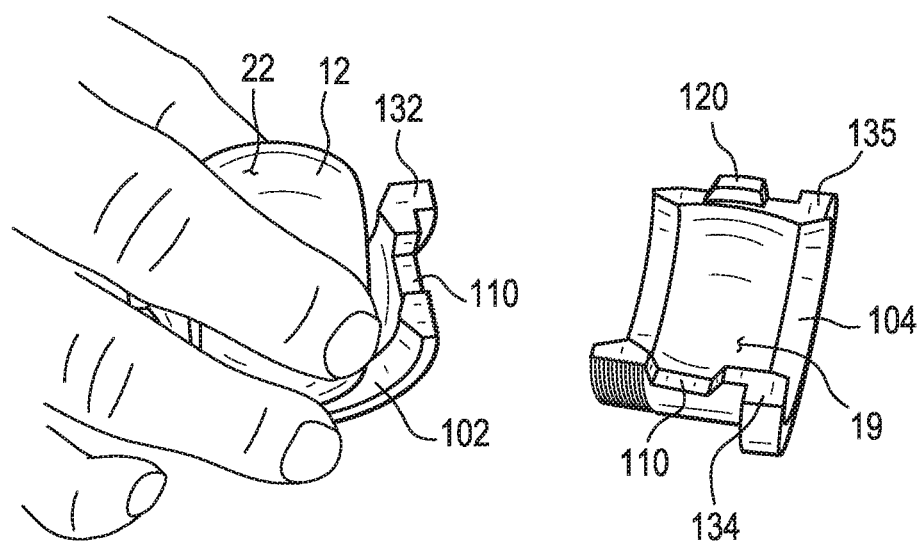
Figure 13D:
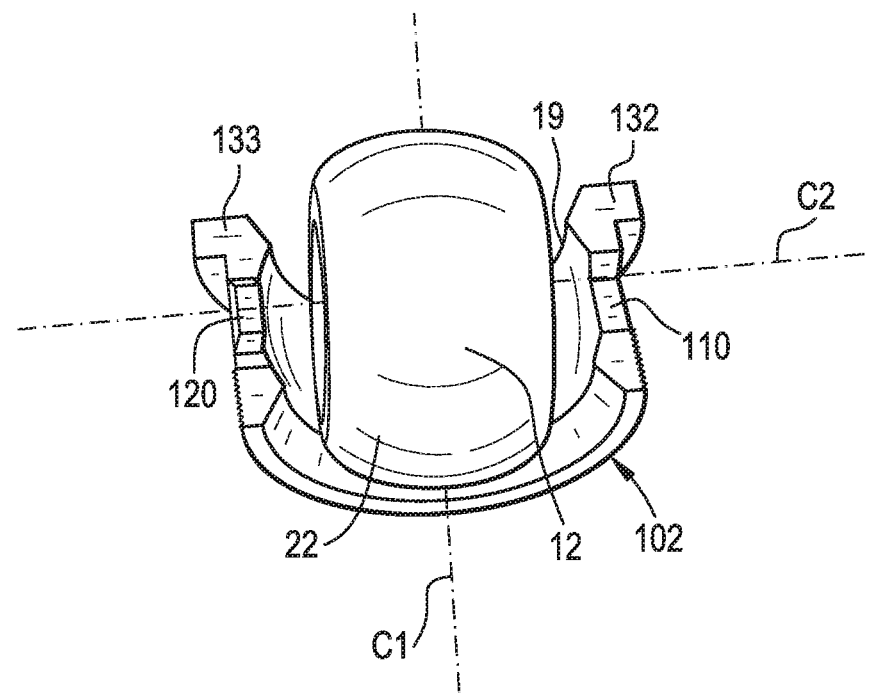
Figure 13E:
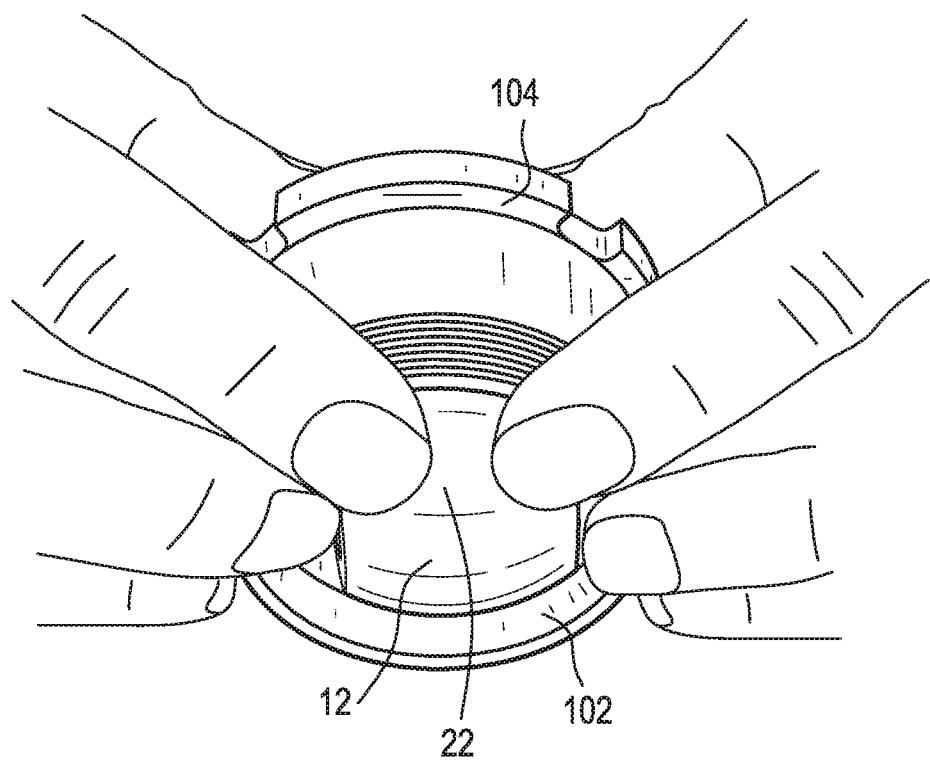
Figure 13F:
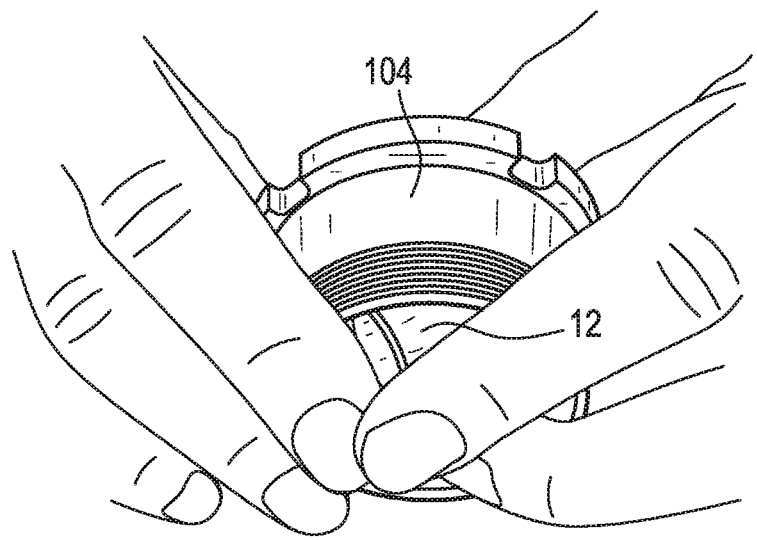
Figure 13G:
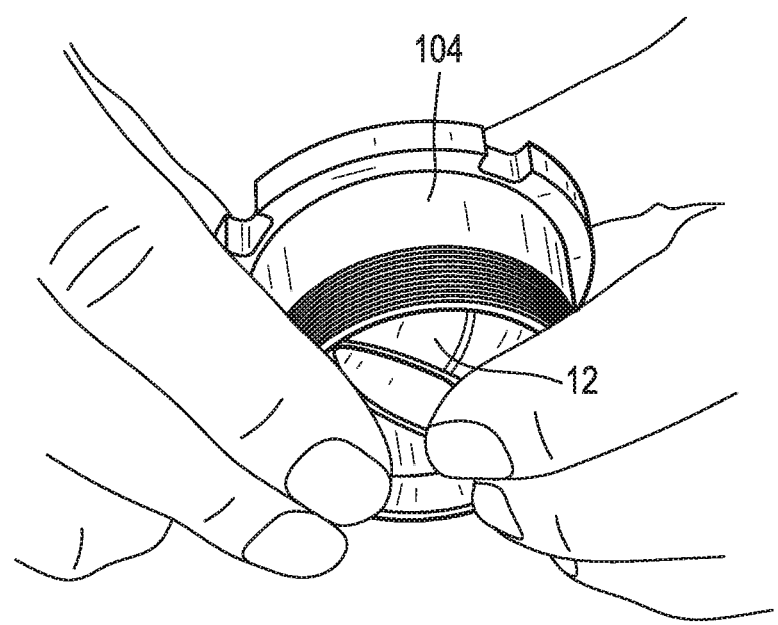
Figure 13H:
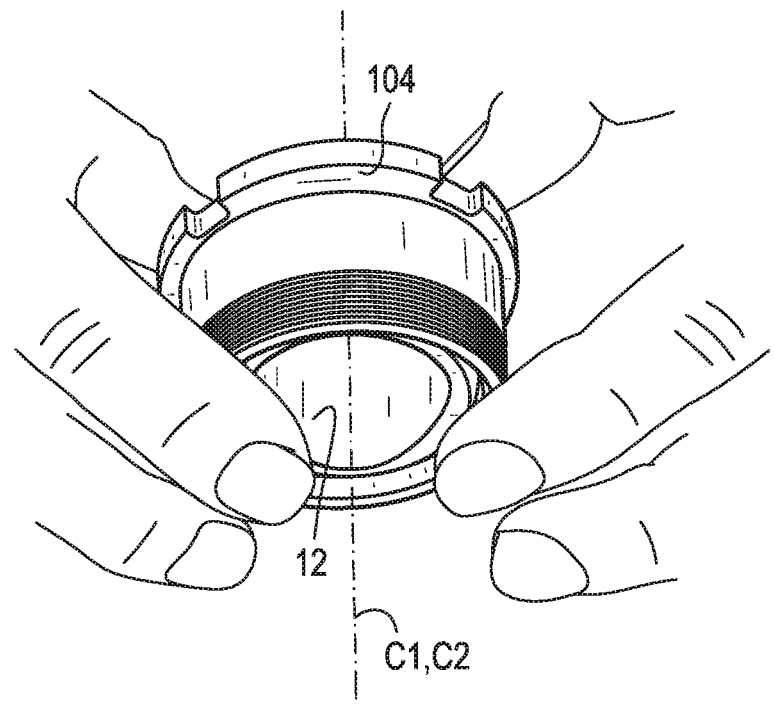
Figure 13I:
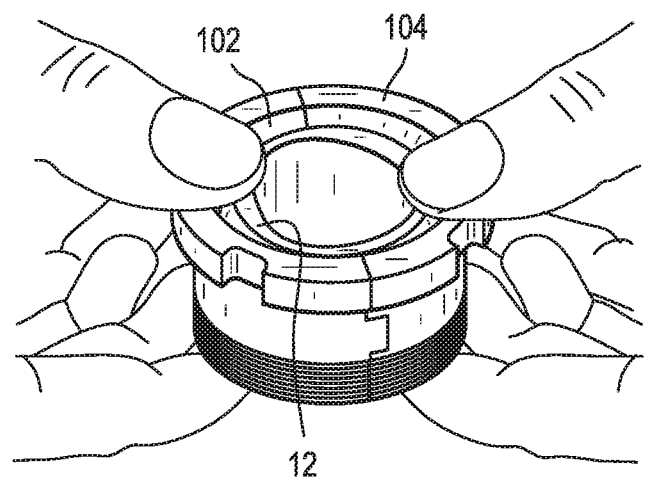

FIGS. 13A-13I illustrate the steps of a method of assembling the bearing 10 having a split outer race 100. The method is referred to herein as the activation member rotation method, which is particularly suitable for use with inner members 12 having the liner 30 disposed thereon to prevent damage to the liner during assembly. As illustrated in FIG. 13A, the method includes providing a split outer race 100 having a first outer race member 102 and a second outer race member 104 that cooperate with each other to form an annular ring or outer race 14. The annular ring 14 defines a first bore extending therethrough, the first bore being concentric about a first axis C1. A first separation face 133 and a second separation face 133 is defined on the first outer race member 102 and a third separation face 134 and a fourth separation face 135 is defined on the second outer race member 104. A concave spherical interior surface 19 is provided on each of the first outer race member 102 and the second outer race member 104. An activation member 12 (e.g., a ball 13) has a convex spherical exterior surface 22 extending between a first axial end 13A and a second axial end 13B of the activation member 12. The activation member 12 defines a second bore extending therethrough. The second bore is concentric about a second axis C2. A locking feature is defined by the first outer race member 102, the second outer race member 104 and the activation member 12. The locking feature has an unlocked position (FIGS. 13E,-G) and a locked position (FIG. 13H-J). As shown in FIGS. 13B-D), the method includes positioning the activation member 12 in the first outer race member 102 in a first position so that the spherical exterior surface 22 engages portions of the concave spherical interior surface 19 and so that the first axis C1 is offset from the second axis C2 by a first angle (e.g., ninety degrees) and so that the first axial end 13A and the second axial end 13B are spaced apart from the first separation face 132 and a second separation face 133. As shown in FIG. 13E the second outer race member 104 is positioned over the activation member 12 to couple the second outer race member 104 to the first out race member 102 (i.e., by engaging the tabs 120 in the respective indentations 110) so that the first separation face 132 of the first outer race member 102 engages a fourth separation face 135 of the second outer race member 104 and the second separation face 133 of the first outer race member 102 engages a third separation face 134 of the second outer race member 104. As shown in FIGS. 13F-I the activation member 12 is rotated (e.g., ninety degrees) from the first position to a second position (FIG. 13I) to move the locking feature from the unlocked position to the locked position causing the spherical exterior surface 22 to engage the portions of the concave spherical interior surface 19 proximate the first separation face 132, the second separation face 133, the third separation face 134 and/or the fourth separation face 13. The rotation of the activation member 12 causes the first axis C1 and the second axis C21 to be concentric.

As shown in FIGS. 14A and 14B the tab projection 120 has an overall width W8 and the indention 120 has an overall width W4. The tab projection 120 has length L2 and the indention 120 has length L2. The split outer race 100 as an overall width W12 and a contact load zone having a width W15 between the flange 14A and the thread 14B. The width W4 and the width W8 and the length L2 are of predetermined magnitudes configured to minimize axial deflection of the split outer race 100 during machining operations. Thus, the width W4 and the width W8 cooperate to define an axial stiffener member in the split outer race. For example, the width W4 is about 35 to 45 percent of the width W15 and the width W8 is about is about 35 to 45 percent of the width W15 and the length L2 is about 55 percent to 65 percent of the width W4 or width W8. In one embodiment, the width W4 is a minimum of 25 percent of the width W12 and the width W8 is about is a minimum of 25 percent of the width W12 and the length L2 is 65 percent to 75 percent of the width W4 or the width W8. In one embodiment, the length L2 is a minimum of 65 percent of the width W4 or the width W8. In one embodiment, the length L2 is a minimum of 75 percent of the width W4 or the width W8. In one embodiment, the width W4 is 25 percent to 65 percent of the width W12 and the width W8 is about is 25 percent to 75 percent of the width W12 and the length L2 is a minimum of 25 percent of the width W4 or the width W8. In one embodiment, the width W4, the width W8 and the length L2 increase with the overall width W12.

In one embodiment, the tab projections 120 and the indentations 110 are positioned centrally in an axial direction. The width W4 of the indentations 110 and the width W8 of the tab projections 120 prevents the split outer race 100 from becoming conical during machining. For example, as shown in FIG. 14A when the split outer race 100 is held in a chuck (e.g., jaws) of a machine such as a lathe at points CF1 the axial stiffener member (i.e., the predetermined widths W4 and W8 of the indentation 110 and the tab projections 120) prevents the opposing end at CF2 from opening and causing the split outer race 100 to be machined in a conical shape. Likewise, as shown in FIG. 14B when the split outer race 100 is held in a chuck (e.g., jaws) of a machine such as a lathe at points CF3 the axial stiffener member (i.e., the predetermined widths W4 and W8 of the indentation 110 and the tab projections 120) prevents the opposing end at CF4 from opening and causing the split outer race 100 to be machined in a conical shape.

Although the invention has been described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. A bearing comprising:
a split outer race having a first outer race member and a second outer race member that form an annular ring;
an activation member rotatable from a first position to a second position, the activation member at least partially disposed in the annular ring; and
at least one locking feature defined by the first outer race member, the second outer race member and the activation member, the at least one locking feature having an unlocked position and a locked position, the unlocked position corresponding to the first position of the activation member and the locked position corresponding to the second position of the activation member;
wherein in the locked position the activation member cooperates with the first outer race member and the second outer race member to create an interference fit; and
wherein:
the first outer race member has a first edge and a second edge, the first edge having a first indentation circumferentially extending therein and the second edge having a first tab projecting circumferentially therefrom;
the second outer race member has a third edge and a fourth edge, the third edge having a second indentation circumferentially extending therein and the fourth edge having a second tab projecting circumferentially therefrom; and
wherein the interference fit is defined by the first tab of the first outer race member being positioned in the second indentation of the second outer race member and the second tab of the second outer race member being positioned in the first indentation of the first outer race member.

2. The bearing of claim 1, wherein about 90 degree rotation of the activation member transforms the locking feature into the locked position.

3. The bearing of claim 1, wherein the interference fit is in the range of up to about 5 mm (0.2 inch).

4. The bearing of claim 1, wherein the interference fit is about 0.3 mm (0.012 inch).

5. The bearing of claim 1, further comprising an axial stiffener member in the split outer race, the axial stiffener member being configured to prevent the split outer race from becoming conical during manufacturing.

6. The bearing of claim 1, wherein the at least one of the first tab, the second tab, the first indentation and the second indentation have a width of a predetermined magnitude to impart axial stiffness on the split outer race.

7. The bearing of claim 6, wherein the width is about 19 to 81 percent of a width of a contact load zone of the split outer race.

8. The bearing of claim 6, wherein at least one of the first tab and the second tab have a length of 38 percent to 88 percent of the width.

9. The bearing of claim 6, wherein the width is a minimum of 25 percent of a width of a contact load zone of the split outer race.

10. The bearing of claim 9, wherein at least one of the first tab and the second tab have a length of 38 percent to 88 percent of the width.

11. The bearing of claim 6, wherein the width is about 13 to 83 percent of a width of a contact load zone of the split outer race.

12. The bearing of claim 6, wherein the width is a minimum of 52 percent of a width of a contact load zone of the split outer race.

13. The bearing of claim 6, wherein the width is a minimum of 14 percent of a width of a contact load zone of the split outer race.

14. The bearing of claim 1, wherein the split outer race comprises a radially outward extending flange extending circumferentially therearound.

15. The bearing of claim 1, wherein:
the first edge having a third indentation circumferentially extending therein and the second edge having a third tab projecting circumferentially therefrom;
the third edge having a fourth indentation circumferentially extending therein and the fourth edge having a fourth tab projecting circumferentially therefrom; and
wherein the interference fit is further defined by the third tab of the first outer race member being positioned in the fourth indentation of the second outer race member and the fourth tab of the second outer race member being positioned in the third indentation of the first outer race member.

16. A method of assembling a bearing having a split outer race, the method comprising:
providing a split outer race having a first outer race member and a second outer race member that cooperate to form an annular ring;
providing an activation member;
providing at least one locking feature defined by the first outer race member, the second outer race member and the activation member, the locking feature having an unlocked position and a locked position;
positioning the activation member in the first outer race member;
forming the annular ring by engaging the second outer race member with the first outer race member such that the activation member is at least partially disposed in the annular ring; and
rotating the activation member from a first position to a second position to move the locking feature from the unlocked position to the locked position.

17. The method of assembling a bearing of claim 16, further comprising:
creating an interference fit between the first outer race member, the second outer race member and the activation member by rotating the activation member from the first position to the second position to move the locking feature from the unlocked position to the locked position.

18. The method of assembling a bearing of claim 17, further comprising:
providing a first indentation circumferentially extending into a first edge of the first outer race member;
providing a first tab projecting circumferentially from a second edge of the first outer race member;
providing a second indentation circumferentially extending into a third edge of the second outer race member;
providing a second tab projecting circumferentially from a fourth edge of the second outer race member; and
forming the annular ring by positioning the first tab of the first outer race member in the second indentation of the second outer race member, and positioning the second tab of the second outer race member in the first indentation of the first outer race member.

19. The method of assembling a bearing of claim 17, further comprising rotating the activation member about 90 degrees to create the interference fit.

20. The method of assembling a bearing of claim 17, further comprising rotating the activation member to create an interference fit in the range of up to about 5 mm (0.2 inch).

21. The method of assembling a bearing of claim 17, further comprising rotating the activation member to create an interference fit of about 0.3 mm (0.012 inch).

22. A method of assembling a bearing having a split outer race, the method comprising:
　providing a split outer race having a first outer race member and a second outer race member that cooperate with each other to form an annular ring, the annular ring defining a first bore extending therethrough, the first bore being concentric about a first axis;
　providing a first separation face and a second separation face on the first outer race member and a third separation face and a fourth separation face on the second outer race member;
　providing a concave spherical interior surface on each of the first outer race member and the second outer race member;
　providing an activation member having a convex spherical exterior surface extending between a first axial end and a second axial end of the activation member, the activation member defining a second bore extending therethrough, the second bore being concentric about a second axis;
　providing at least one locking feature defined by the first outer race member, the second outer race member and the activation member, the at least one locking feature having an unlocked position and a locked position;
　positioning the activation member in the first outer race in a first position so that the spherical exterior surface engages the concave spherical interior surface proximate the first separation face and the second separation face and so that the first axis is offset from the second axis by a first angle and so that the first axial end and the second axial end are spaced apart from the first separation face and the second separation face;
　positioning the second outer race member over the activation member and coupling the second outer race member to the first out race member so that the first separation face of the first outer race member engages the fourth separation face of the second outer race member and the second separation face of the first outer race member engages the third separation face of the second outer race member; and
　rotating the activation member from the first position to a second position to move the locking feature from the unlocked position to the locked position causing the spherical exterior surface to engage the concave spherical interior surface proximate at least one of the first separation face, the second separation face, the third separation face and the fourth separation face.

23. The method of claim 22, wherein the first angle is about ninety degrees.

24. The method of claim 23, wherein the rotating of the activation member causes the first axis and the second axis to be concentric.

25. A method of assembling a bearing having a split outer race, the method comprising:
　providing a split outer race having a first outer race member and a second outer race member that cooperate with each other to form an annular ring, the annular ring defining a first bore extending therethrough, the first bore being concentric about a first axis;
　providing a first separation face and a second separation face on the first outer race member and a third separation face and a fourth separation face on the second outer race member;
　providing a concave spherical interior surface on each of the first outer race member and the second outer race member;
　providing an activation member having a convex spherical exterior surface extending between a first axial end and a second axial end of the activation member, the activation member defining a second bore extending therethrough, the second bore being concentric about a second axis;
　providing at least one locking feature defined by the first outer race member, the second outer race member and the activation member, the at least one locking feature having an unlocked position and a locked position;
　snap fitting the activation member in the first outer race in a first position so that the spherical exterior surface engages the concave spherical interior surface and so that the first axis is concentric with the second axis; and
　snap fitting the second outer race member over the activation member and coupling the second outer race member to the first out race member so that the first separation face of the first outer race member engages the fourth separation face of the second outer race member and the second separation face of the first outer race member engages the third separation face of the second outer race member.

26. A bearing comprising:
　a split outer race having a first outer race member and a second outer race member that form an annular ring;
　an activation member rotatable from a first position to a second position, the activation member at least partially disposed in the annular ring; and
　at least one locking feature defined by the first outer race member, the second outer race member and the activation member, the at least one locking feature having an unlocked position and a locked position, the unlocked position corresponding to the first position of the activation member and the locked position corresponding to the second position of the activation member; and
　wherein about 90 degree rotation of the activation member transforms the locking feature into the locked position.

27. The bearing of claim 26, wherein in the locked position the activation member cooperates with the first outer race member and the second outer race member to create an interference fit.

28. The bearing of claim 27, wherein:
　the first outer race member has a first edge and a second edge, the first edge having a first indentation circumferentially extending therein and the second edge having a first tab projecting circumferentially therefrom;
　the second outer race member has a third edge and a fourth edge, the third edge having a second indentation circumferentially extending therein and the fourth edge having a second tab projecting circumferentially therefrom; and
　wherein the interference fit is defined by the first tab of the first outer race member being positioned in the second indentation of the second outer race member and the second tab of the second outer race member being positioned in the first indentation of the first outer race member.

29. The bearing of claim 27, wherein the interference fit is in the range of up to about 5 mm (0.2 inch).

30. The bearing of claim 27, wherein the interference fit is about 0.3 mm (0.012 inch).

31. The bearing of claim 28, wherein the at least one of the first tab, the second tab, the first indentation and the second indentation have a width of a predetermined magnitude to impart axial stiffness on the split outer race.

32. The bearing of claim 31, wherein the width is about 19 to 81 percent of a width of a contact load zone of the split outer race.

33. The bearing of claim 31, wherein at least one of the first tab and the second tab have a length of 38 percent to 88 percent of the width.

34. The bearing of claim 31, wherein the width is a minimum of 25 percent of a width of a contact load zone of the split outer race.

35. The bearing of claim 34, wherein at least one of the first tab and the second tab have a length of 38 percent to 88 percent of the width.

36. The bearing of claim 31, wherein the width is about 13 to 83 percent of a width of a contact load zone of the split outer race.

37. The bearing of claim 31, wherein the width is a minimum of 52 percent of a width of a contact load zone of the split outer race.

38. The bearing of claim 31, wherein the width is a minimum of 14 percent of a width of a contact load zone of the split outer race.

39. The bearing of claim 28, wherein:
the first edge having a third indentation circumferentially extending therein and the second edge having a third tab projecting circumferentially therefrom;
the third edge having a fourth indentation circumferentially extending therein and the fourth edge having a fourth tab projecting circumferentially therefrom; and
wherein the interference fit is further defined by the third tab of the first outer race member being positioned in the fourth indentation of the second outer race member and the fourth tab of the second outer race member being positioned in the third indentation of the first outer race member.

40. The bearing of claim 26, further comprising an axial stiffener member in the split outer race, the axial stiffener member being configured to prevent the split outer race from becoming conical during manufacturing.

41. The bearing of claim 26, wherein the split outer race comprises a radially outward extending flange extending circumferentially therearound.

42. A bearing comprising:
a split outer race having a first outer race member and a second outer race member that form an annular ring;
an activation member rotatable from a first position to a second position, the activation member at least partially disposed in the annular ring; and
at least one locking feature defined by the first outer race member, the second outer race member and the activation member, the at least one locking feature having an unlocked position and a locked position, the unlocked position corresponding to the first position of the activation member and the locked position corresponding to the second position of the activation member; and
an axial stiffener member in the split outer race, the axial stiffener member being configured to prevent the split outer race from becoming conical during manufacturing.

43. The bearing of claim 42, wherein in the locked position the activation member cooperates with the first outer race member and the second outer race member to create an interference fit.

44. The bearing of claim 43, wherein:
the first outer race member has a first edge and a second edge, the first edge having a first indentation circumferentially extending therein and the second edge having a first tab projecting circumferentially therefrom;
the second outer race member has a third edge and a fourth edge, the third edge having a second indentation circumferentially extending therein and the fourth edge having a second tab projecting circumferentially therefrom; and
wherein the interference fit is defined by the first tab of the first outer race member being positioned in the second indentation of the second outer race member and the second tab of the second outer race member being positioned in the first indentation of the first outer race member.

45. The bearing of claim 43, wherein the interference fit is in the range of up to about 5 mm (0.2 inch).

46. The bearing of claim 43, wherein the interference fit is about 0.3 mm (0.012 inch).

47. The bearing of claim 44, wherein the at least one of the first tab, the second tab, the first indentation and the second indentation have a width of a predetermined magnitude to impart axial stiffness on the split outer race.

48. The bearing of claim 47, wherein the width is about 19 to 81 percent of a width of a contact load zone of the split outer race.

49. The bearing of claim 47, wherein at least one of the first tab and the second tab have a length of 38 percent to 88 percent of the width.

50. The bearing of claim 47, wherein the width is a minimum of 25 percent of a width of a contact load zone of the split outer race.

51. The bearing of claim 50, wherein at least one of the first tab and the second tab have a length of 38 percent to 88 percent of the width.

52. The bearing of claim 47, wherein the width is about 13 to 83 percent of a width of a contact load zone of the split outer race.

53. The bearing of claim 47, wherein the width is a minimum of 52 percent of a width of a contact load zone of the split outer race.

54. The bearing of claim 47, wherein the width is a minimum of 14 percent of a width of a contact load zone of the split outer race.

55. The bearing of claim 44, wherein:
the first edge having a third indentation circumferentially extending therein and the second edge having a third tab projecting circumferentially therefrom;
the third edge having a fourth indentation circumferentially extending therein and the fourth edge having a fourth tab projecting circumferentially therefrom; and
wherein the interference fit is further defined by the third tab of the first outer race member being positioned in the fourth indentation of the second outer race member and the fourth tab of the second outer race member being positioned in the third indentation of the first outer race member.

56. The bearing of claim 42, wherein about 90 degree rotation of the activation member transforms the locking feature into the locked position.

57. The bearing of claim 42, wherein the split outer race comprises a radially outward extending flange extending circumferentially therearound.

\* \* \* \* \*